United States Patent
Balasubramanian et al.

(10) Patent No.: US 11,950,099 B2
(45) Date of Patent: Apr. 2, 2024

(54) TECHNIQUES FOR PROTECTING CONTROL INFORMATION

(71) Applicant: QUALCOMM Incorporated, San Diego, CA (US)

(72) Inventors: Anantharaman Balasubramanian, San Diego, CA (US); Hong Cheng, Basking Ridge, NJ (US); Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/644,683

(22) Filed: Dec. 16, 2021

(65) Prior Publication Data

US 2023/0199494 A1 Jun. 22, 2023

(51) Int. Cl.
| | |
|---|---|
| *H04W 12/106* | (2021.01) |
| *H04W 12/02* | (2009.01) |
| *H04W 12/069* | (2021.01) |
| *H04W 72/20* | (2023.01) |

(52) U.S. Cl.
CPC ......... *H04W 12/106* (2021.01); *H04W 12/02* (2013.01); *H04W 12/069* (2021.01); *H04W 72/20* (2023.01)

(58) Field of Classification Search
CPC . H04W 12/106; H04W 12/02; H04W 12/069; H04W 72/20; H04W 12/041; H04W 12/06; H04W 12/10; H04W 12/108; H04W 12/122
See application file for complete search history.

(56) References Cited

U.S. PATENT DOCUMENTS

| | | | | |
|---|---|---|---|---|
| 2021/0204250 | A1* | 7/2021 | Ashraf | H04W 72/56 |
| 2021/0373874 | A1* | 12/2021 | Chen | H04W 4/50 |
| 2021/0385865 | A1* | 12/2021 | Mueck | H04W 74/0816 |
| 2022/0272682 | A1* | 8/2022 | Hahn | H04L 5/00 |

* cited by examiner

*Primary Examiner* — Mazda Sabouri
(74) *Attorney, Agent, or Firm* — Dalei Dong; Harrity & Harrity, LLP

(57) ABSTRACT

Various aspects of the present disclosure generally relate to wireless communication. In some aspects, a receiver user equipment (UE) may receive at least one control communication that includes a first part and a second part. The UE may determine an authenticity status of the at least one control communication based at least in part on at least one of a common security key corresponding to the first part or a private security key corresponding to the second part. The UE may perform a wireless communication task based at least in part on the authenticity status of the at least one control communication. Numerous other aspects are described.

24 Claims, 14 Drawing Sheets

TECHNIQUES FOR PROTECTING CONTROL INFORMATION

FIELD OF THE DISCLOSURE

Aspects of the present disclosure generally relate to wireless communication and to techniques and apparatuses for protecting control information.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a receiver user equipment (UE). The method may include receiving at least one control communication that includes a first part and a second part. The method may include determining an authenticity status of the at least one control communication based at least in part on at least one of a common security key corresponding to the first part or a private security key corresponding to the second part. The method may include performing a wireless communication task based at least in part on the authenticity status of the at least one control communication.

Some aspects described herein relate to a method of wireless communication performed by a transmitter network node. The method may include encoding at least one control communication comprising a first part and a second part, wherein a common security key corresponds to the first part and a private security key corresponds to the second part. The method may include transmitting the at least one control communication to a receiver UE.

Some aspects described herein relate to a receiver UE for wireless communication. The receiver UE may include a memory and one or more processors coupled to the memory. The one or more processors may be configured to receive at least one control communication that includes a first part and a second part. The one or more processors may be configured to determine an authenticity status of the at least one control communication based at least in part on at least one of a common security key corresponding to the first part or a private security key corresponding to the second part. The one or more processors may be configured to perform a wireless communication task based at least in part on the authenticity status of the at least one control communication.

Some aspects described herein relate to a transmitter network node for wireless communication. The transmitter network node may include a memory and one or more processors coupled to the memory. The one or more processors may be configured to encode at least one control communication comprising a first part and a second part, wherein a common security key corresponds to the first part and a private security key corresponds to the second part. The one or more processors may be configured to transmit the at least one control communication to a receiver UE.

Some aspects described herein relate to a non-transitory computer-readable medium that stores a set of instructions for wireless communication by a receiver UE. The set of instructions, when executed by one or more processors of the UE, may cause the receiver UE to receive at least one control communication that includes a first part and a second part. The set of instructions, when executed by one or more processors of the receiver UE, may cause the receiver UE to determine an authenticity status of the at least one control communication based at least in part on at least one of a common security key corresponding to the first part or a private security key corresponding to the second part. The set of instructions, when executed by one or more processors of the receiver UE, may cause the receiver UE to perform a wireless communication task based at least in part on the authenticity status of the at least one control communication.

Some aspects described herein relate to a non-transitory computer-readable medium that stores a set of instructions for wireless communication by a transmitter network node. The set of instructions, when executed by one or more processors of the transmitter network node, may cause the transmitter network node to encode at least one control communication comprising a first part and a second part, wherein a common security key corresponds to the first part and a private security key corresponds to the second part. The set of instructions, when executed by one or more processors of the transmitter network node, may cause the transmitter network node to transmit the at least one control communication to a receiver UE.

Some aspects described herein relate to an apparatus for wireless communication. The apparatus may include means for receiving at least one control communication that includes a first part and a second part. The apparatus may include means for determining an authenticity status of the at least one control communication based at least in part on at least one of a common security key corresponding to the first part or a private security key corresponding to the second part. The apparatus may include means for performing a wireless communication task based at least in part on the authenticity status of the at least one control communication.

Some aspects described herein relate to an apparatus for wireless communication. The apparatus may include means for encoding at least one control communication comprising a first part and a second part, wherein a common security key corresponds to the first part and a private security key corresponds to the second part. The apparatus may include means for transmitting the at least one control communication to a receiver UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
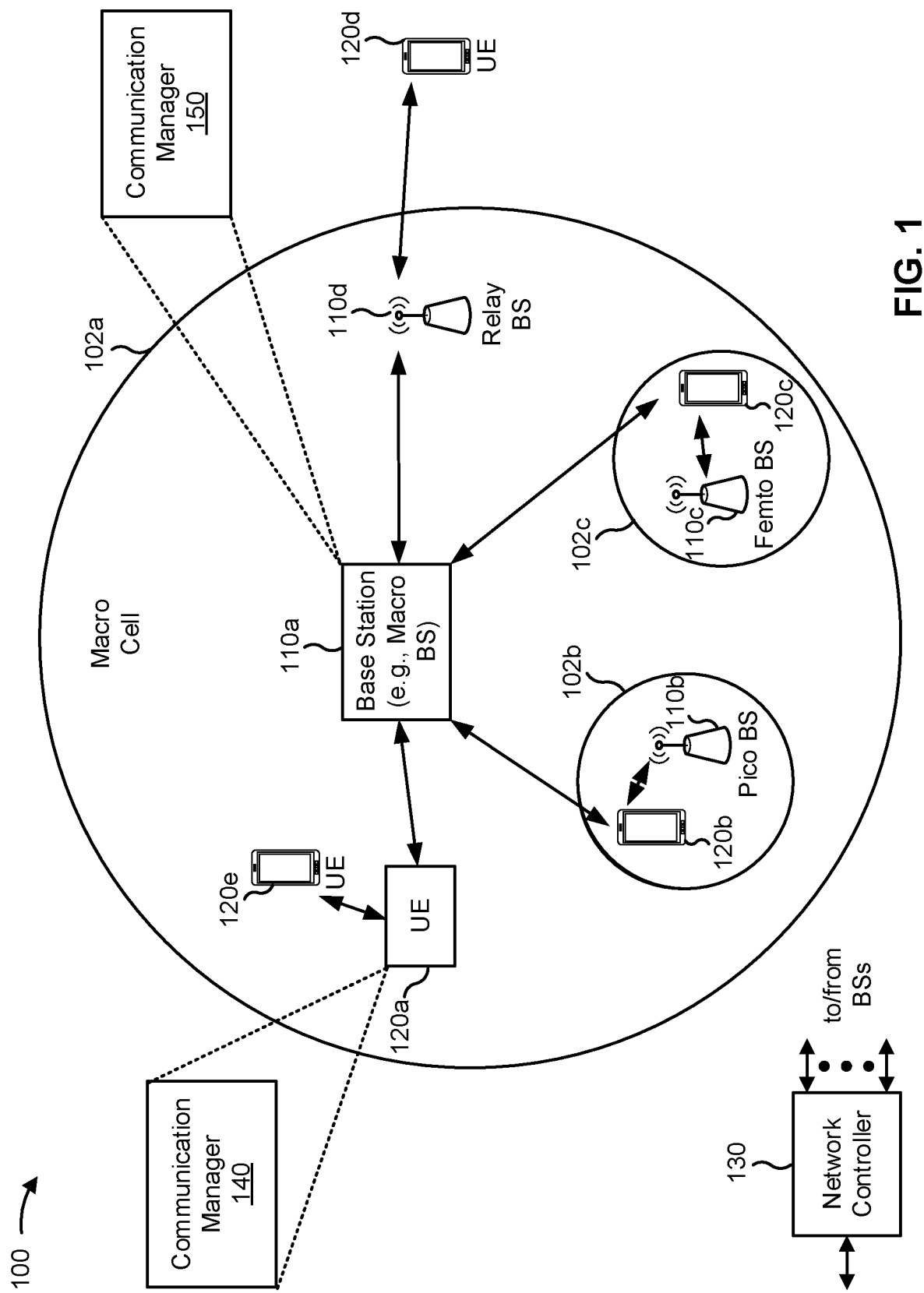
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive at least one control communication that includes a first part and a second part; determine an authenticity status of the at least one control communication based at least in part on at least one of a common security key corresponding to the first part or a private security key corresponding to the second part; and perform a wireless communication task based at least in part on the authenticity status of the at least one control communication. Additionally, or alternatively, the communication manager 140 may perform one or more other operations described herein.

In some aspects, the transmitter network node may include a communication manager 140 or a communication manager 150. As described in more detail elsewhere herein, the communication manager 140 or the communication manager 150 may encode at least one control communication comprising a first part and a second part, wherein a common security key corresponds to the first part and a private security key corresponds to the second part; and transmit the at least one control communication to a receiver UE. Additionally, or alternatively, the communication manager 140 or the communication manager 150 may perform one or more other operations described herein.

As indicated above, FIG. 1 is provided as an example. Other examples may differ from what is described with regard to FIG. 1.

Figure 2:
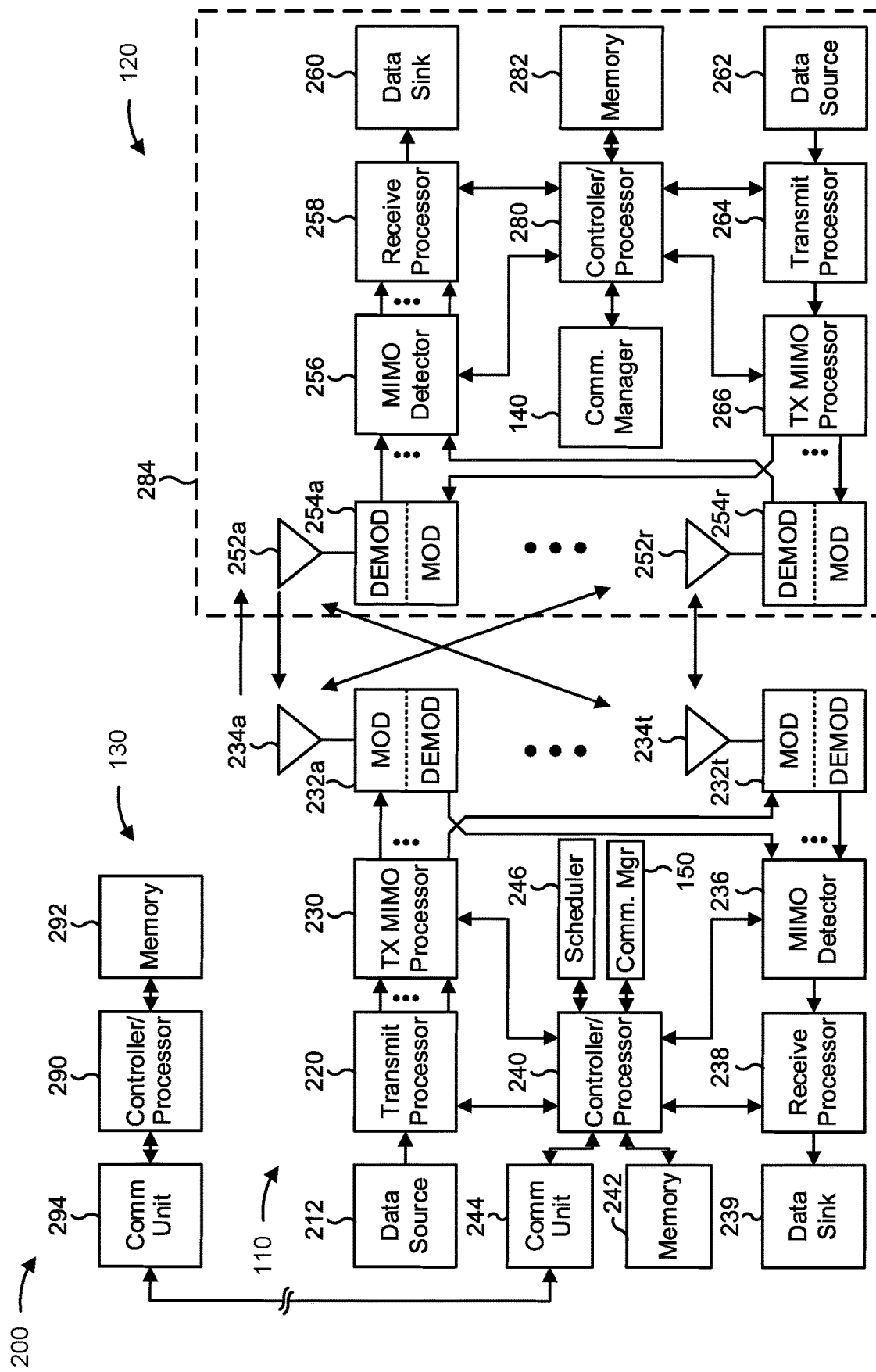
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-14).

The controller/processor 240 of the base station 110, the controller/processor 280 of the UE 120, and/or any other component(s) of FIG. 2 may perform one or more techniques associated with protecting control information, as described in more detail elsewhere herein. In some aspects, the network node (e.g., the transmitter network node) described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the receiver UE includes means for receiving at least one control communication that includes a first part and a second part; means for determining an authenticity status of the at least one control communication based at least in part on at least one of a common security key corresponding to the first part or a private security key corresponding to the second part; and/or means for performing a wireless communication task based at least in part on the authenticity status of the at least one control communication. The means for the receiver UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitter network node includes means for encoding at least one control communication comprising a first part and a second part, wherein a common security key corresponds to the first part and a private security key corresponds to the second part; and/or means for transmitting the at least one control communication to a receiver UE. In some aspects, the means for the transmitter network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitter network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
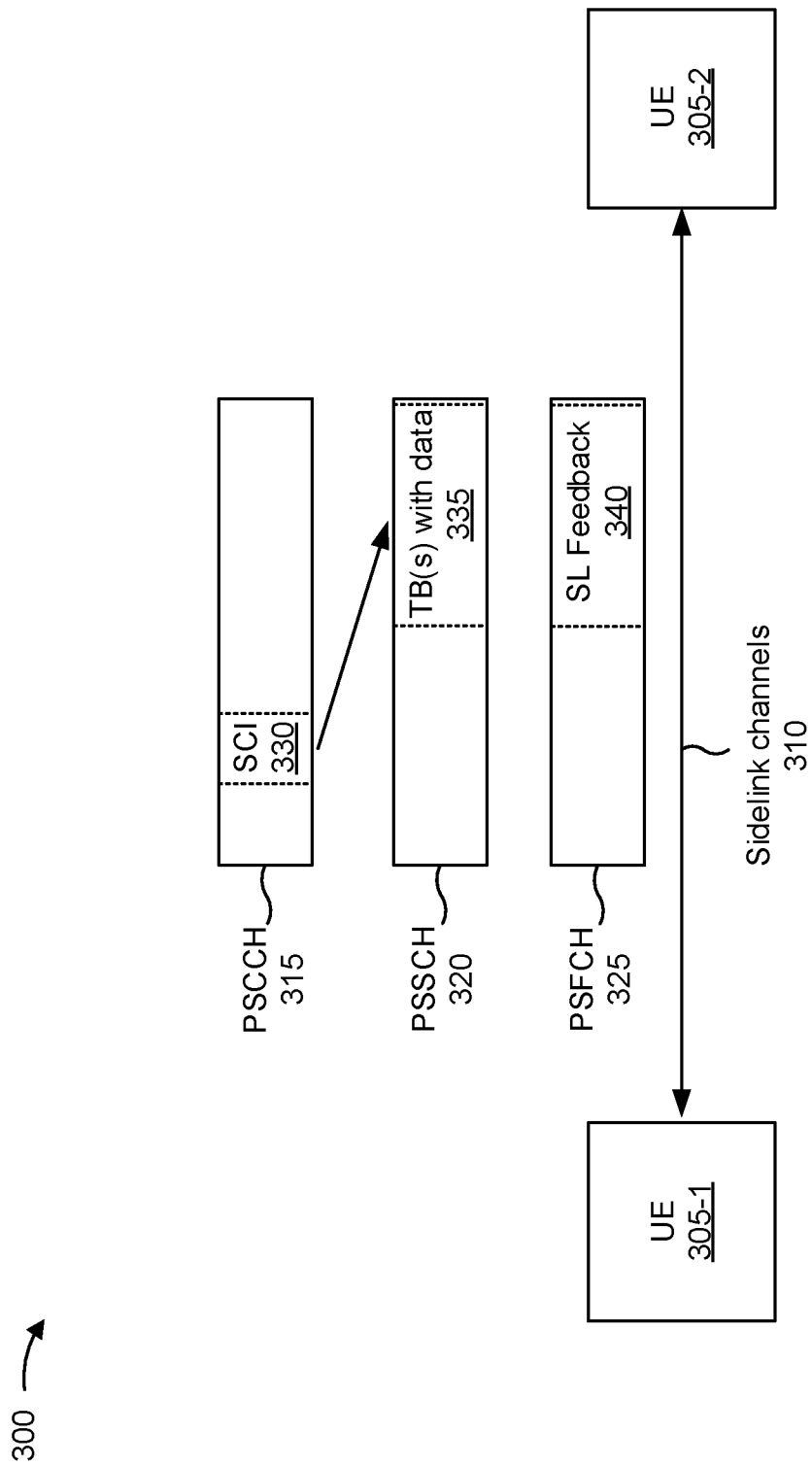
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as one or more HARQ process identifiers (IDs), a new data indicator (NDI), a source ID, one or more destination IDs, and/or one or more channel state information (CSI) report triggers. A receiver UE 305 (e.g., UE 305-1 or UE 305-2) first decodes the SCI-1, which indicates a format of the SCI-2 that is transmitted. Based on decoding the SCI-1, the receiver UE 305 determines a resource allocation for the SCI-2 and decodes the SCI-2. Based on checking the destination ID or destination IDs, the receiver UE 305 determines whether the receiver UE 305 is an intended recipient of the transmission and, if so, decodes a TB carried on the PSSCH 320. A UE 305 is an intended recipient of a transmission if the transmission is directed to the UE 305. A transmission that is directed to a UE 305 includes a destination ID that corresponds to the UE 305 so that the UE 305 can determine that the UE 305 is an intended recipient of the transmission and so that other UEs can determine that the other UEs are not intended recipients of the transmission (and, thus, do not decode the transmission).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

The control information carried in SCI-1 and SCI-2 is not protected from attacks at the physical layer and can be vulnerable to attacks at the physical layer. This vulnerability can result from the fact that any sidelink UE can transmit SCI and/or can decode SCI from any other UEs. Thus, "man-in-the-middle" attacks can be performed by altering the contents of SCI-1 and/or SCI-2 fields. For example, SCI-1 contains reservations performed by a transmitter UE for future transmissions. An eavesdropper UE could arbitrarily reserve resources thereby depriving other UEs of the transmit opportunity. In some cases, the eavesdropper UE can change the reservation fields in SCI-1, resulting in misinformation provided to other UEs.

In some cases, a transmitter UE can intentionally increase a transmit priority of a message, thereby forcing a receiver UE to receive the message. This can cause the receiver UE to miss transmit opportunities, thereby increasing packet delay budgets. Eavesdropping UEs can receive transmissions of a legitimate transmitter UE and can spoof feedback to the transmission. This type of feedback spoofing is possible because feedback resources are mapped based on transmitter ID and the subchannel in which the SCI is transmitted.

As indicated above, FIG. 3 is provided as an example. Other examples may differ from what is described with respect to FIG. 3.

Figure 4:
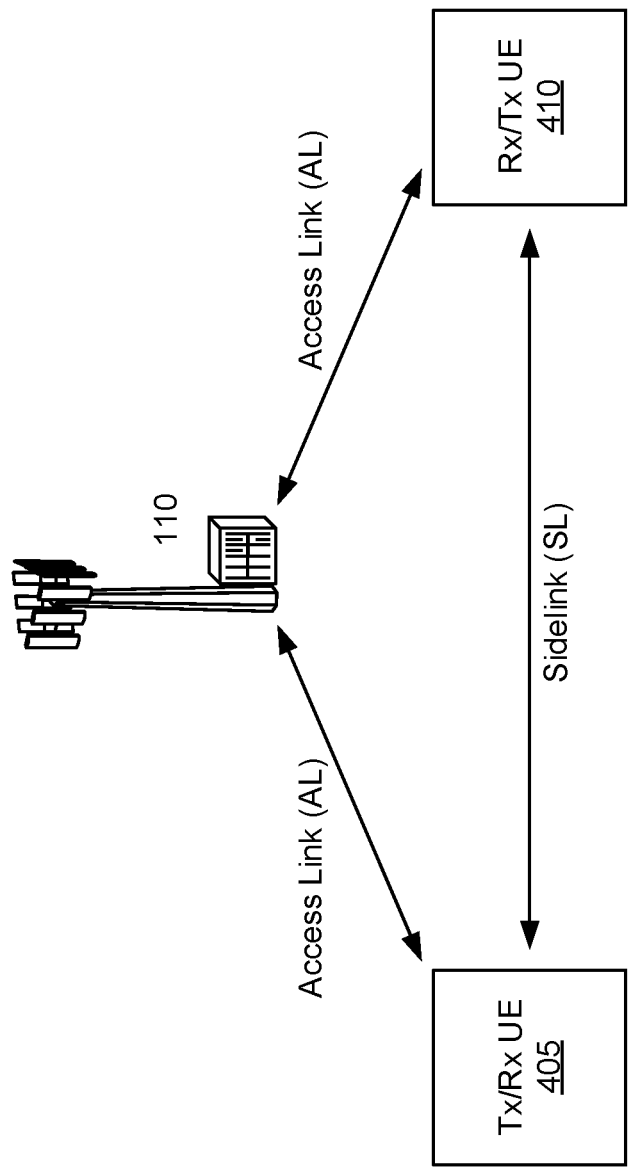
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described above in connection with FIG. 3, sidelink control communications can be subject to attack, as SCI is not protected. Similarly, access link control information can be subject to attack at the physical layer. For example, an attacking device can transmit a random control information communication that reserves multiple resources, thereby misleading a receiving device by not allowing the receiving device to reserve resources. As another aspect, an attacking device can listen to valid control message transmissions from other UEs to obtain an identifier of a valid UE and can spoof the valid UE by using its identifier. Physical layer attacks of control information can cause communication disruptions, consumption of useful communication resources, transmission delays and/or other negative impacts to network performance.

Some aspects of the techniques described herein may protect control information. In some aspects, at least one control communication may include a first part and a second part. In some aspects, for example, the first part may include a set of common information and the second part may include a set of private information. Common information is information that is information that does not have an identified intended recipient, and private information is information that has an intended recipient. For example, a receiver UE that is not an intended recipient of the private information may decode the common information but not the private information, whereas an intended recipient may decode the common information and the private information.

In some aspects, a receiver UE may receive the at least one control communication and may determine an authenticity status of the at least one control communication. The receiver UE may determine the authenticity status of the at least one control communication based at least in part on at least one of a common security key corresponding to the first part or a private security key corresponding to the second part. The receiver UE may perform a wireless communication task based at least in part on the authenticity status of the at least one control communication. For example, if the receiver UE determines that the at least one control communication is authentic, the receiver UE may obtain control information from the at least one control communication.

As indicated above, FIG. 4 is provided as an example. Other examples may differ from what is described with respect to FIG. 4.

Figure 5:
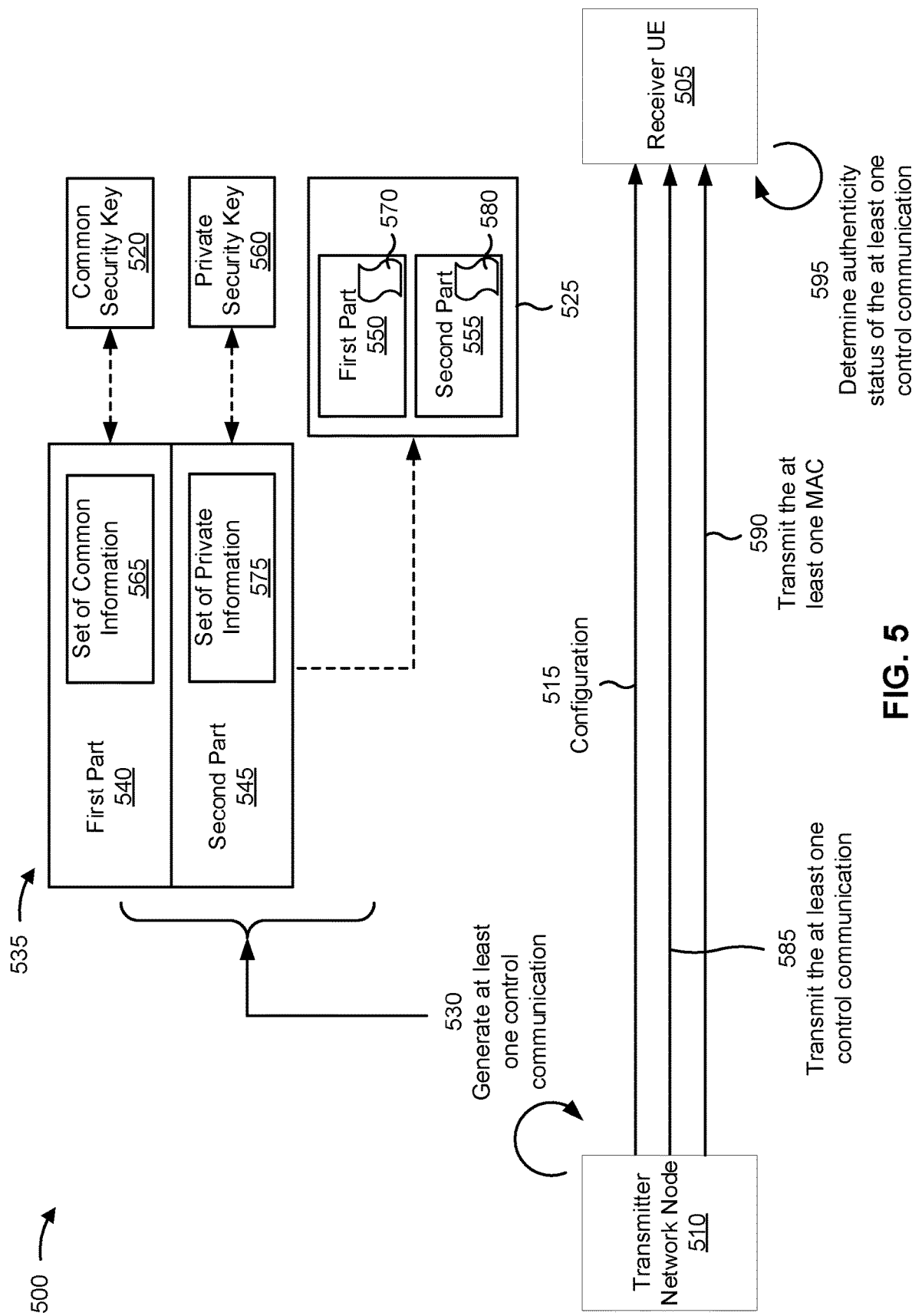
FIGS. 5-10 are diagrams illustrating examples associated with protecting control information, in accordance with the present disclosure.

FIG. 5 is a diagram illustrating an example 500 of protecting control information, in accordance with the present disclosure. As shown in FIG. 5, a receiver UE 505 and a transmitter network node 510 may communicate with one another. The receiver UE 505 and the transmitter network node 510 may communicate via a wireless network link such as a sidelink or an access link. In some aspects, the receiver UE 505 may be, or be similar to, the Rx/Tx UE 410 depicted in FIG. 4, the UE 305-1 and/or the UE 305-2 depicted in FIG. 3, and/or the UE 120 depicted in FIGS. 1 and 2. In some aspects, the transmitter network node 510 may be, or be similar to, the Tx/Rx UE 405 depicted in FIG. 4, the UE 305-1 and/or the UE 305-2 depicted in FIG. 3, the UE 120 depicted in FIGS. 1 and 2, and/or the base station 110 depicted in FIGS. 1, 2, and 4. In some aspects, the transmitter network node 510 may include a non-terrestrial network node, a roadside unit, an industrial controller, and/or a relay device, among other examples.

As shown by reference number 515, the transmitter network node 510 may transmit, and the receiver UE 505 may receive, a configuration. In some aspects, the configuration may indicate a common security key 520 that may be used by the receiver UE 505 to facilitate determining an authenticity of at least one control communication 525. As shown by reference number 530, the transmitter network node 510 may generate the at least one control communication 525. In some aspects, the transmitter network node 510 may generate the at least one control communication 525 based at least in part on gathering control information, which may include one or more control information elements, multiplexing the control information together to form at least one control message 535 and encoding the at least one control message 535 using a channel coding operation to generate the at least one control communication 525.

As shown, the at least one control message 535 may include a first part 540 and a second part 545. The at least one control communication 525 also may include a first part 550 corresponding to the first part 540 of the at least one control message 535 and a second part 555 corresponding to the second part 545 of the at least one control message 535. The transmitter network node 510 may generate the at least one control communication 525 so that the common security key 520 corresponds to the first part 550 of the at least one control communication 525 (and the first part 540 of the at least one control message 535) and a private security key 560 corresponds to the second part 555 of the at least one control communication 525 (and the second part 545 of the at least one control message 535).

In some aspects, the first part 540 of the at least one control message 535 may include a set 565 of common information, and the first part 550 of the at least one control communication 525 may include a set 570 of encoded common information corresponding to the set 565 of common information associated with the at least one control message 535. The second part 545 of the at least one control message 535 may include a set 575 of private information, and the second part 555 of the at least one control communication 525 may include a set 580 of encoded private information corresponding to the set 575 of private information associated with the at least one control message 535. In some aspects, the first part 550 of the at least one control communication 525 may include a first SCI message (e.g., an SCI-1) that includes the set 570 of encoded common information and the second part 555 of the at least one control communication 525 may include a second SCI message (e.g., an SCI-2) that includes the set 580 of encoded private information. In some aspects, the first part 550 of the at least one control communication 525 may include at least one of a portion of the first SCI message or a portion of the second SCI message. Similarly, the second part 555 of the at least one control communication 525 may include at least one of a portion of the first SCI message or a portion of the second SCI message.

In some aspects, the common security key 520 may include a pre-configured security key. As indicated above, the transmitter network node 510 may transmit a configuration that indicates the common security key 520. In some other aspects, the common security key 520 may be indicated by another device such as, for example, an additional network node. In some aspects, the common security key 520 may be indicated by a wireless communication standard.

In some aspects, the private security key 560 may be situationally-dependent, device-dependent, and/or communication-dependent, among other examples. For example, in some aspects, the at least one control communication 525 may include at least one sidelink communication, the transmitter network node 510 may include a transmitter UE, and the receiver UE 505 may be an intended recipient of the at least one control communication 525. The receiver UE 505 may include at least one of an intended unicast recipient of the at least one sidelink communication or an intended groupcast recipient of the at least one sidelink communication (e.g., in examples in which the at least one sidelink communication is intended for one or more additional UEs in addition to the receiver UE 505). The private security key 560 may be based at least in part on the receiver UE 505 being the at least one of the intended unicast recipient of the at least one sidelink communication or the intended groupcast recipient of the at least one sidelink communication. In some aspects, the receiver UE 505 may be located within a specified distance of the transmitter network node 510. The private security key 560 may be based at least in part on the receiver UE 505 being located within the specified distance of the transmitter network node 510.

In some aspects, the private security key 560 may be based at least in part on a configured higher layer key. For example, the configured higher layer key may include at least one of an RRC integrity protection key, $K_{RRCint}$, an RRC signal ciphering key, $K_{RRCenc}$, or a Next Generation Radio Access Network (NG-RAN) cryptographic key, $K_{gNB}$. In some aspects, the private security key 560, $K_p$, may be based at least in part on a key derivation function. The key derivation function may be a function of the NG-RAN cryptographic key, a current slot number, and/or a set of signaling parameters, among other examples. For example, in some aspects, the private security key 560 $K_p$=KDF ($K_{gNB}$, slot #, params), where KDF is a key derivation function, slot # is the current slot number, and params denotes one or more key-related signaling parameters provided by a gNB and/or a roadside unit. The set of signaling parameters may be an empty set, a set of one signaling parameter, or a set of more than one signaling parameters. In some aspects, the private security key 560 $K_p$ may be generated at each slot to dynamically update private keys on a per slot basis. For example, the private security key 560 may correspond to a first slot and an additional private security key (not shown) may correspond to a second slot.

In some aspects, the private security key 560 may be based at least in part on one or more physical channel characteristics associated with the at least one control communication 525. For example, the at least one control communication 525 may include at least one sidelink communication and the private security key 560 may be based at least in part on one or more physical characteristics associated with the at least one sidelink communication. The at least one sidelink communication may be a unicast communication and the private security key 560 may be based at least in part on a channel reciprocity between the transmitter network node 510 and the receiver UE 505. In some aspects, the private security key 560 may be based at least in part on a configured higher layer key and one or more physical channel characteristics associated with the at least one sidelink communication.

As shown by reference number 585, the transmitter network node 510 may transmit, and the receiver UE 505 may receive, the at least one control communication 525. As shown by reference number 590, the transmitter network node 510 may transmit, and the receiver UE 505 may receive, at least one message authentication code (MAC). In some aspects, the at least one MAC may be transmitted as part on the at least one control communication 525 or separate from the at least one control communication 525. The at least one MAC may be used by the receiver UE 505 to facilitate determining an authenticity status of the at least one control communication 525. In some aspects in which the at least one control communication 525 includes a first SCI message and a second SCI message, the at least one MAC may include a first MAC corresponding to the first SCI message and a second MAC corresponding to the second SCI message.

As shown by reference number 595, the receiver UE 505 may determine an authenticity status of the at least one control communication 525. In some aspects, the receiver UE 505 may determine the authenticity status of the at least one control communication 525 based at least in part on at least one of the common security key 520 corresponding to the first part 550 of the at least one control communication 525 or the private security key 560 corresponding to the second part 555 of the at least one control communication 525. In some aspects, for example, the receiver UE 505 may use the common security key 520 to facilitate decoding the set 570 of encoded common information. The receiver UE 505 may derive the private security key 560 and use the private security key 560 to facilitate decoding the set 580 of encoded private information.

As indicated above, the private security key 560 may be situationally-dependent, device-dependent, and/or communication-dependent, among other examples. For example, in some aspects, the receiver UE 505 may include at least one of an intended unicast recipient of the at least one sidelink communication or an intended groupcast recipient of the at least one sidelink communication, and the receiver UE 505 may derive the private security key 560 based at least in part on the receiver UE 505 being the at least one of the intended unicast recipient of the at least one sidelink communication or the intended groupcast recipient of the at least one sidelink communication. In some aspects, the receiver UE 505 may be located within a specified distance of the transmitter network node 510 and the UE 505 may derive the private security key 560 based at least in part on the receiver UE 505 being located within the specified distance of the transmitter network node 510.

In some aspects, the receiver UE 505 may derive the private security key 560 based at least in part on a configured higher layer key (e.g., the $K_{RRCint}$, the $K_{RRCenc}$, and/or the $K_{gNB}$). In some aspects, the receiver UE 505 may derive the private security key 560 based at least in part on a key derivation function. The key derivation function may be a function of the NG-RAN cryptographic key, a current slot number, and/or a set of signaling parameters, among other examples. In some aspects, the receiver UE 505 may derive the private security key 560 based at least in part on one or more physical channel characteristics associated with the at least one control communication 525. For example, the at least once control communication 525 may include at least one sidelink communication and the receiver UE 505 may derive the private security key 560 based at least in part on one or more physical characteristics associated with the at least one sidelink communication. The at least one sidelink communication may be a unicast communication and receiver UE 505 may derive the private security key 560 based at least in part on a channel reciprocity between the transmitter network node 510 and the receiver UE 505.

As indicated above, FIG. 5 is provided as an example. Other examples may differ from what is described with respect to FIG. 5.

In some aspects, the receiver UE 505 may determine the authenticity status of the at least one control communication 525 based at least in part on the at least one MAC. FIGS. 6-10 depict examples of protecting control information using at least one MAC.

Figure 6:
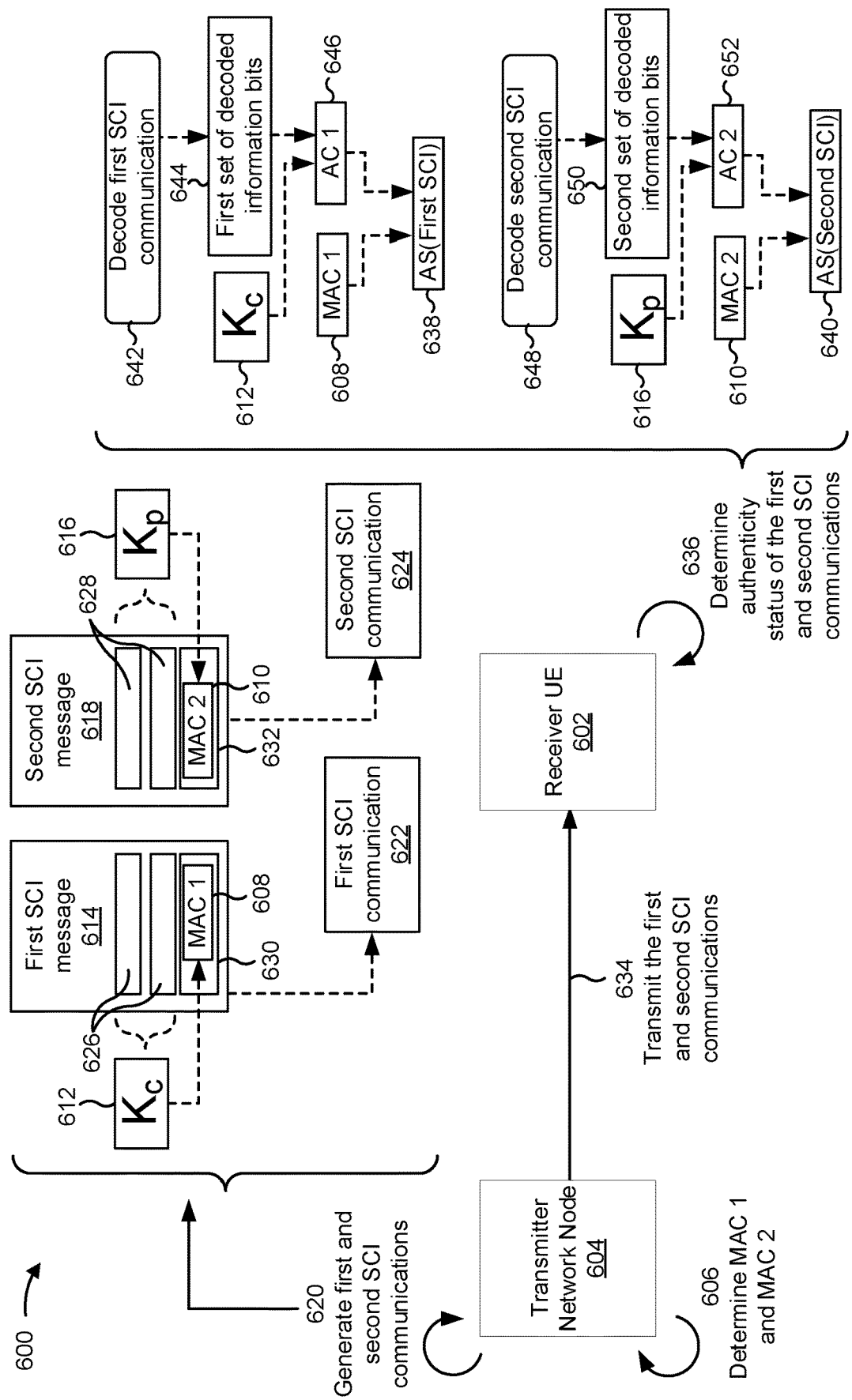

FIG. 6 is a diagram illustrating an example 600 of protecting control information, in accordance with the present disclosure. As shown in FIG. 6, a receiver UE 602 and a transmitter network node 604 may communicate with one another. The receiver UE 602 and the transmitter network node 604 may communicate via a wireless network link such as a sidelink or an access link. In some aspects, the receiver UE 602 may be, or be similar to, the receiver UE 505 depicted in FIG. 5. In some aspects, the transmitter network node 604 may be, or be similar to, the transmitter network node 510 depicted in FIG. 5.

As shown by reference number 606, the transmitter network node 604 may determine a first MAC (shown as "MAC 1") 608 and a second MAC (shown as "MAC 2") 610. For example, in some aspects, the transmitter network node 604 may determine MAC 1 based at least in part on a common security key 612, $K_c$, and one or more information bits associated with a first SCI message 614. The transmitter network node 604 may determine MAC 2 based at least in part on a private security key 616, $K_p$, and one or more information bits associated with a second SCI message 618.

As shown by reference number 620, the transmitter network node 604 may generate a first SCI communication 622 and a second SCI communication 624. For example, the transmitter network node 604 may generate the first SCI message 614 and the second SCI message 618 and encode the first SCI message 614 and the second SCI message 618 to generate the first SCI communication 622 and the second SCI communication 624, respectively. In some aspects, the first SCI communication 622 may be an SCI-1 and the second SCI communication 624 may be an SCI-2. The first SCI message 614 may include a first set 626 of specified data fields (e.g., specified by a wireless communication standard) and the second SCI message 618 may include a second set 628 of specified data fields (e.g., specified by the wireless communication standard). The first set 626 of specified data fields may include the one or more information bits associated with the first SCI message 614 and the second set 628 of specified data fields may include the one or more information bits associated with the second SCI message 618. The first SCI message 614 may include a first dedicated data field 630 for carrying the MAC 1 608 and the second SCI message 618 may include a second dedicated data field 632 for carrying MAC 2 610.

As shown by reference number 634, the transmitter network node 604 may transmit, and the receiver UE 602 may receive, the first SCI communication 622 and the second SCI communication 624. As shown by reference number 636, the receiver UE 602 may determine an authenticity status (shown as "AS(First SCI)" 638) of the first SCI communication 622 and an authenticity status (shown as "AS(Second SCI)" 640) of the second SCI communication 624.

For example, as shown by reference number 642, the receiver UE 602 may decode the first SCI communication 622 to determine a first set 644 of decoded information bits associated with the first SCI message 614. The first set 644 of decoded information bits may correspond to a first set of decoded data fields corresponding to the first set 626 of specified data fields. The first set of decoded data fields may exclude the first dedicated data field 630. The receiver UE 602 may determine a first authentication code 646 (shown as "AC 1") based at least in part on the first set 644 of decoded information bits and the common security key $K_c$ 612. The receiver UE 602 may compare AC 1 646 with the MAC 1 608 to determine the AS(First SCI) 638.

Similarly, as shown by reference number 648, the receiver UE 602 may decode the second SCI communication 624 to determine a second set 650 of decoded information bits associated with the second SCI message 618. The second set 650 of decoded information bits may correspond to a second set of decoded data fields corresponding to the second set 628 of specified data fields. The second set of decoded data fields may exclude the second dedicated data field 632. The receiver UE 602 may determine a second authentication code 652 (shown as "AC 2") based at least in part on the second set 650 of decoded information bits and the private security key $K_p$ 616. The receiver UE 602 may compare the AC 2 652 with the MAC 2 610 to determine the AS(Second SCI) 640.

In some aspects, the transmitter network node 604 may determine the MAC 1 608 based at least in part on the encoded bits of the first SCI communication 622 and the common security key $K_c$ 612. The transmitter network node 604 may determine the MAC 2 610 based at least in part on the encoded bits of the second SCI communication 624 and the private security key $K_p$ 616. The transmitter network node 604 may append the MAC 1 608 to the encoded bits of the first SCI communication 622 and may append the MAC 2 610 to the encoded bits of the second SCI communication 624. Similarly, the receiver UE 602 may determine the AC 1 646 based at least in part on the encoded bits of the first SCI communication 622 and the common security key $K_c$ 612. The receiver UE 602 may determine the AC 2 652 based at least in part on the encoded bits of the second SCI communication 624 and the private security key $K_p$ 616.

As indicated above, FIG. 6 is provided as an example. Other examples may differ from what is described with respect to FIG. 6.

Figure 7:
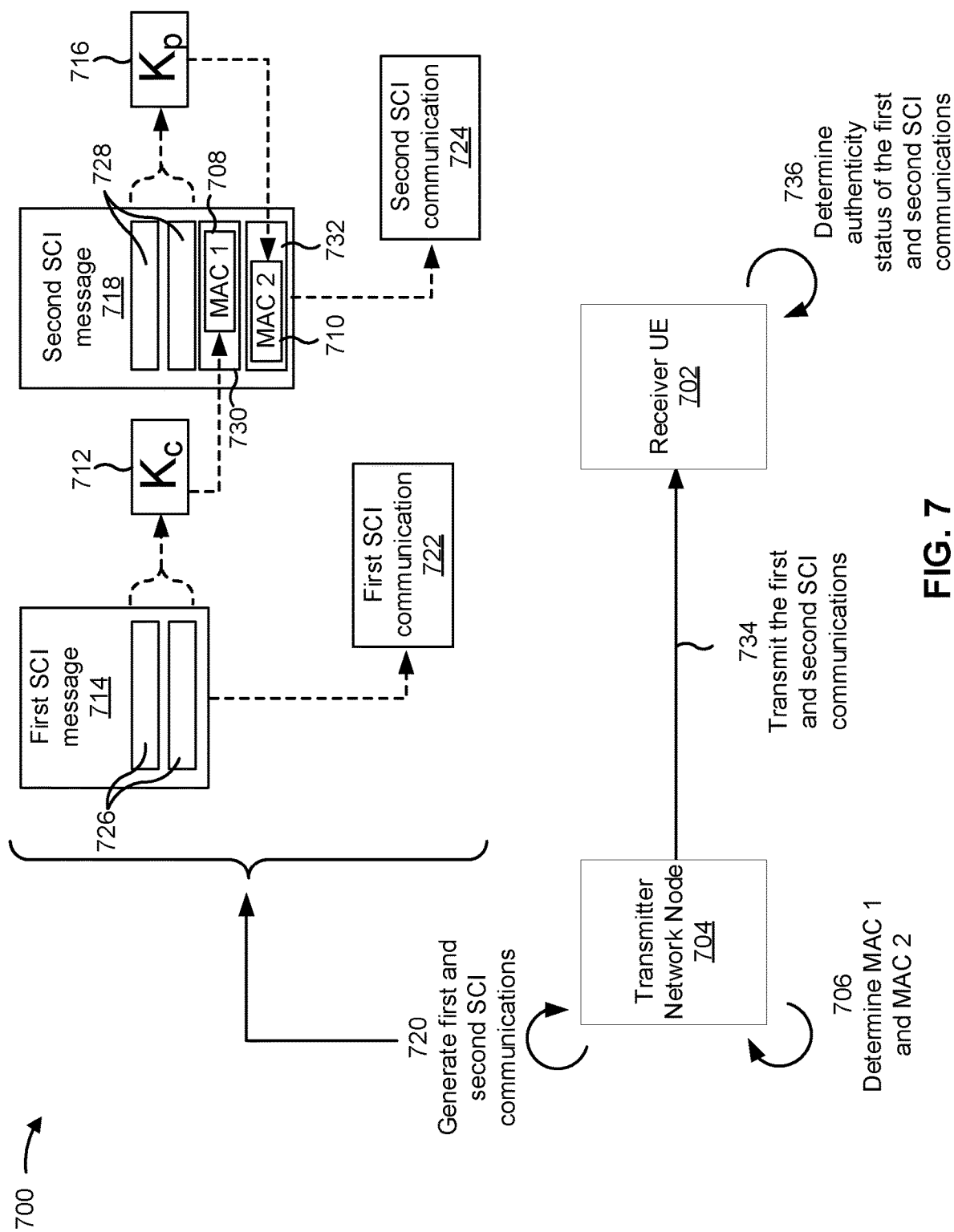

FIG. 7 is a diagram illustrating an example 700 of protecting control information, in accordance with the present disclosure. As shown in FIG. 7, a receiver UE 702 and a transmitter network node 704 may communicate with one another. The receiver UE 702 and the transmitter network node 704 may communicate via a wireless network link such as a sidelink or an access link. In some aspects, the receiver UE 702 may be, or be similar to, the receiver UE 505 depicted in FIG. 5. In some aspects, the transmitter network node 704 may be, or be similar to, the transmitter network node 510 depicted in FIG. 5.

As shown by reference number 706, the transmitter network node 704 may determine a first MAC (shown as "MAC 1") 708 and a second MAC (shown as "MAC 2") 710. For example, in some aspects, the transmitter network node 704 may determine the MAC 1 based at least in part on a common security key 712, $K_c$, and one or more information bits associated with a first SCI message 714. The transmitter network node 704 may determine the MAC 2 based at least in part on a private security key 716, $K_p$, and one or more information bits associated with a second SCI message 718.

As shown by reference number 720, the transmitter network node 704 may generate a first SCI communication 722 and a second SCI communication 724. For example, the transmitter network node 704 may generate the first SCI message 714 and the second SCI message 718 and may encode the first SCI message 714 and the second SCI message 718 to generate the first SCI communication 722 and the second SCI communication 724, respectively. In some aspects, the first SCI communication 722 may be an SCI-1 and the second SCI communication 724 may be an SCI-2. The first SCI message 714 may include a first set 726 of specified data fields (e.g., specified by a wireless communication standard) and the second SCI message 718 may include a second set 728 of specified data fields (e.g., specified by the wireless communication standard). The first set 726 of specified data fields may include the one or more information bits associated with the first SCI message 714 and the second set 728 of specified data fields may include the one or more information bits associated with the second SCI message 718. The second SCI message 718 may include a first dedicated data field 730 for carrying the MAC 1 708 and a second dedicated data field 732 for carrying the MAC 2 710.

As shown by reference number 734, the transmitter network node 704 may transmit, and the receiver UE 702 may receive, the first SCI communication 722 and the second SCI communication 724. As shown by reference number 736, the receiver UE 702 may determine an authenticity status of the first SCI communication 722 and an authenticity status of the second SCI communication 724. In some aspects, the receiver UE 702 may use a similar procedure for determining the authenticity status of each of the first SCI communication 722 and the second SCI communication 724 as the procedure described above in connection with FIG. 6, except that the receiver UE 702 may use all of the decoded data fields of the first SCI communication 722 and the common security key 712 to derive a first authentication code and the receiver UE 702 may use all of the decoded data fields of the second SCI communication 724 (excluding the first dedicated data field 730 and the second dedicated data field 732) and the private security key 716 to determine a second authentication code.

As described above, for example, the receiver UE 702 may determine an authenticity status of the first SCI communication 722 based at least in part on comparing the first authentication code with the MAC 1 708 and an authenticity status of the second SCI communication 724 based at least in part on comparing the second authentication code with the MAC 2 710. Aspects illustrated in FIG. 7 may be backward compatible, as the first SCI message may be an SCI-1, as specified in a wireless communication standard, which may be decoded by prior UEs.

In some aspects, the transmitter network node 704 may determine the MAC 1 708 based at least in part on the encoded bits of the first SCI communication 722 and the common security key $K_c$ 712. The transmitter network node 704 may determine the MAC 2 710 based at least in part on the encoded bits of the second SCI communication 724 and the private security key $K_p$ 716. The transmitter network node 704 may append the MAC 1 708 and the MAC 2 710 to the encoded bits of the second SCI communication 724. As described above in connection with FIG. 6, the receiver UE 702 may determine the first authentication code based at least in part on the encoded bits of the first SCI communication 722 and the common security key $K_c$ 712. The receiver UE 702 may determine the second authentication code based at least in part on the encoded bits of the second SCI communication 724 and the private security key $K_p$ 716.

As indicated above, FIG. 7 is provided as an example. Other examples may differ from what is described with respect to FIG. 7.

Figure 8:
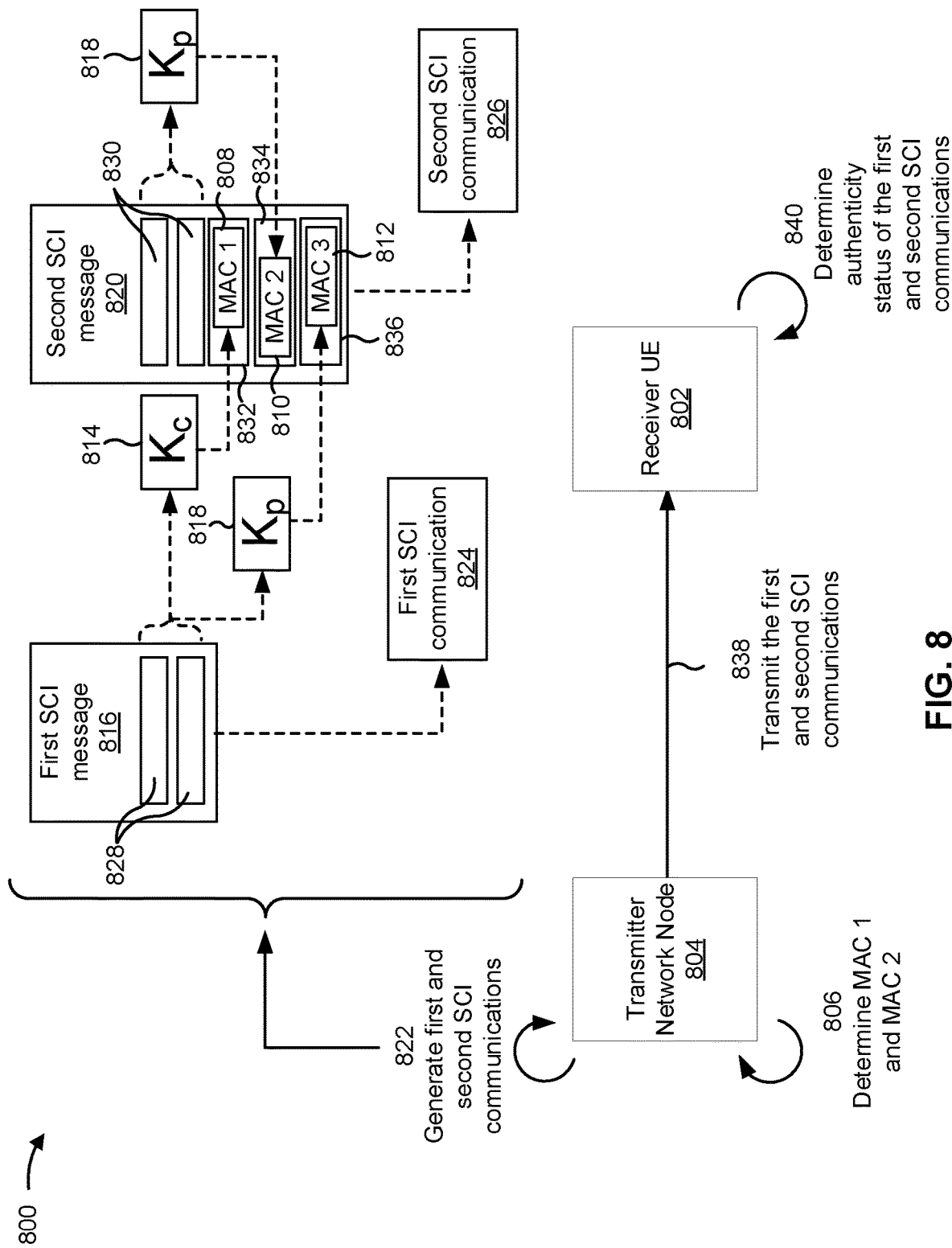

FIG. 8 is a diagram illustrating an example 800 of protecting control information, in accordance with the present disclosure. As shown in FIG. 8, a receiver UE 802 and a transmitter network node 804 may communicate with one another. The receiver UE 802 and the transmitter network node 804 may communicate via a wireless network link such as a sidelink or an access link. In some aspects, the receiver UE 802 may be, or be similar to, the receiver UE 505 depicted in FIG. 5. In some aspects, the transmitter network node 804 may be, or be similar to, the transmitter network node 510 depicted in FIG. 5.

As shown by reference number 806, the transmitter network node 804 may determine a first MAC (shown as "MAC 1") 808, a second MAC (shown as "MAC 2") 810, and a third MAC (shown as "MAC 3") 812. For example, in some aspects, the transmitter network node 804 may determine the MAC 1 808 based at least in part on a common security key 814, $K_c$, and one or more information bits associated with a first SCI message 816. The transmitter network node 804 may determine the MAC 2 810 based at least in part on a private security key $K_p$ 818 and one or more information bits associated with a second SCI message 820. The transmitter network node 804 may determine the MAC 3 812 based at least in part on the private security key $K_p$ 818 and the one or more information bits associated with the first SCI message 816.

As shown by reference number 822, the transmitter network node 804 may generate a first SCI communication 824 and a second SCI communication 826. For example, the transmitter network node 804 may generate the first SCI message 816 and the second SCI message 820 and may encode the first SCI message 816 and the second SCI message 820 to generate the first SCI communication 824 and the second SCI communication 826, respectively. In some aspects, the first SCI communication 824 may be an SCI-1 and the second SCI communication 826 may be an SCI-2. The first SCI message 816 may include a first set 828 of specified data fields (e.g., specified by a wireless communication standard) and the second SCI message 820 may include a second set 830 of specified data fields (e.g., specified by the wireless communication standard). The first set 828 of specified data fields may include the one or more information bits associated with the first SCI message 816 and the second set 830 of specified data fields may include the one or more information bits associated with the second SCI message 820. The second SCI message 820 may include a first dedicated data field 832 for carrying the MAC 1 808, a second dedicated data field 834 for carrying the MAC 2 810, and a third dedicated data field 836 for carrying the MAC 3 812. In some aspects, the SCI message 816 may include a third dedicated data field for carrying the MAC 3 812.

As shown by reference number 838, the transmitter network node 804 may transmit, and the receiver UE 802 may receive, the first SCI communication 824 and the second SCI communication 826. As shown by reference number 840, the receiver UE 802 may determine an authenticity status of the first SCI communication 824 and an authenticity status of the second SCI communication 826. In some aspects, the receiver UE 802 may use a similar procedure for determining the authenticity status of each of the first SCI communication 824 and the second SCI communication 826 as described above in connection with FIG. 7, except that the receiver UE 802 may also use all of the decoded data fields of the first SCI communication 824 and the private security key 818 to derive a third authentication code.

As described above, for example, the receiver UE 802 may determine an authenticity status of the first SCI communication 824 based at least in part on comparing the first authentication code with the MAC 1 808 and an authenticity status of the second SCI communication 826 based at least in part on comparing the second authentication code with the MAC 2 810. The receiver UE 802 may further determine an authenticity status of the first SCI communication 824 and, in some aspects, the second SCI communication 826 based at least in part on comparing the third authentication code with the MAC 3 812. In some aspects, using a third MAC, as described above, may facilitate enhanced trust among UEs involved in private communication with one another, as the third MAC may provide further information associated with an authenticity status of common information (e.g., information carried by the first SCI communication 824). As the common security key $K_c$ may be more likely to be possessed by more UEs than the private security key $K_p$, using the third MAC described above may facilitate avoiding a situation in which a "man-in-the-middle" UE can alter the contents of common information but still be able to derive a valid first MAC for the altered contents of the common information using the common security key $K_c$.

In some aspects, the transmitter network node 804 may determine the MAC 1 808 based at least in part on the encoded bits of the first SCI communication 824 and the common security key $K_c$ 814. The transmitter network node 804 may determine the MAC 2 810 based at least in part on the encoded bits of the second SCI communication 826 and the private security key $K_p$ 818. The transmitter network node 804 may determine the MAC 3 812 based at least in part on the encoded bits of the first SCI communication 824 and the private security key $K_p$ 818. The transmitter network node 804 may append the MAC 1 808, the MAC 2 810, and the MAC 3 812 to the encoded bits of the second SCI communication 826. As described above in connection with FIG. 7, the receiver UE 802 may determine the first authentication code based at least in part on the encoded bits of the first SCI communication 824 and the common security key $K_c$ 712. The receiver UE 802 may determine the second authentication code based at least in part on the encoded bits of the second SCI communication 826 and the private security key $K_p$ 818. The receiver UE 802 may determine the third authentication code based at least in part on the encoded bits of the first SCI communication 824 and the private security key $K_p$ 818.

As indicated above, FIG. 8 is provided as an example. Other examples may differ from what is described with respect to FIG. 8.

Figure 9:
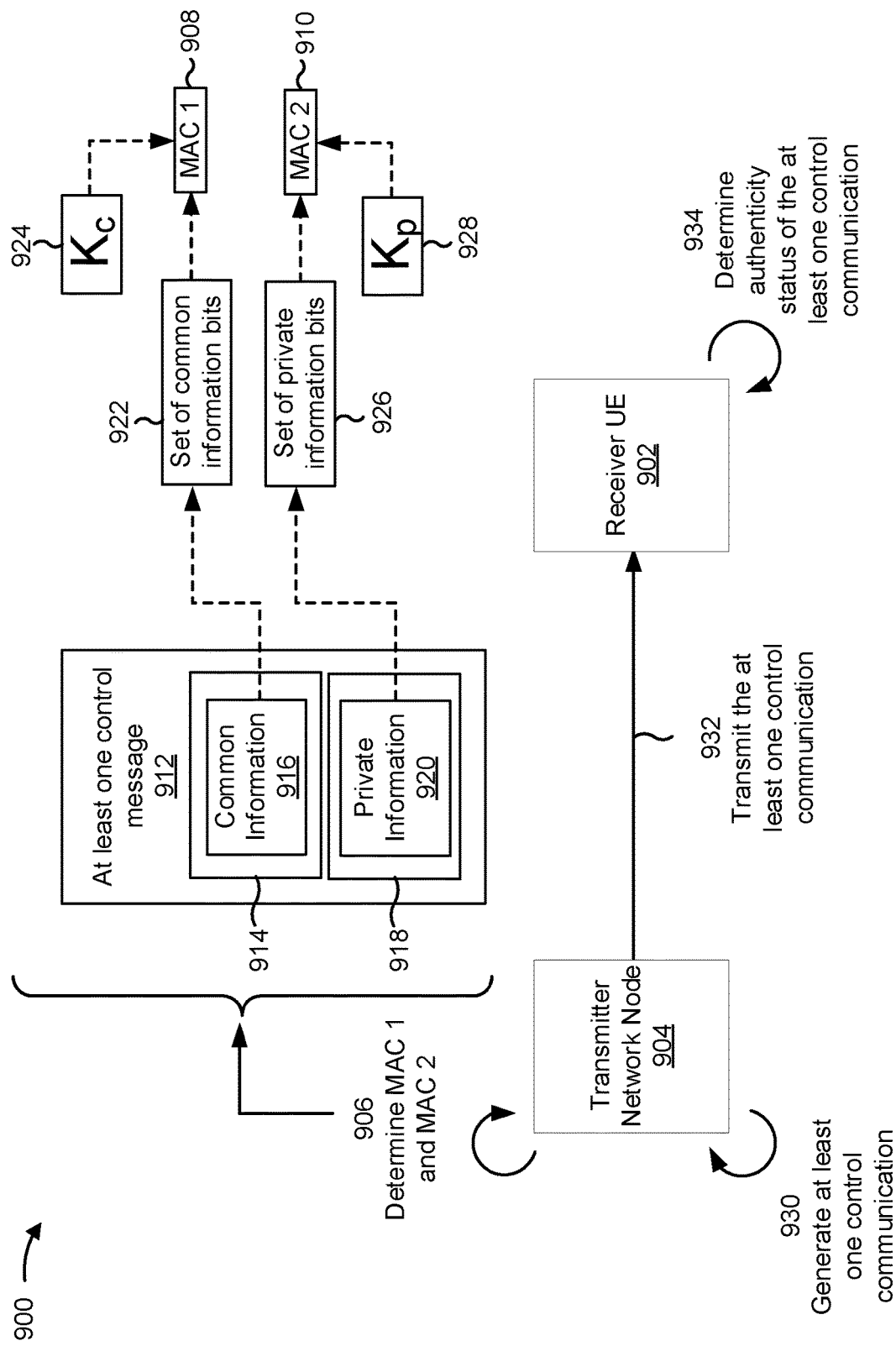

FIG. 9 is a diagram illustrating an example 900 of protecting control information, in accordance with the present disclosure. As shown in FIG. 9, a receiver UE 902 and a transmitter network node 904 may communicate with one another. The receiver UE 902 and the transmitter network node 904 may communicate via a wireless network link such as a sidelink or an access link. In some aspects, the receiver UE 902 may be, or be similar to, the receiver UE 505 depicted in FIG. 5. In some aspects, the transmitter network node 904 may be, or be similar to, the transmitter network node 510 depicted in FIG. 5.

As shown by reference number 906, the transmitter network node 904 may determine a first MAC (shown as "MAC 1") 908 and a second MAC (shown as "MAC 2") 910 based at least in part on at least one control message 912. The at least one control message 912 may include at least one SCI message (e.g., a first SCI message and a second SCI message) or at least one access control message. In some aspects, the at least one control message 912 has a first part 914 that includes a set 916 of common information (shown as "common information") and a second part 918 that includes a set 920 of private information (shown as "private information"). The first part 914 may include a first control message (e.g., a first SCI message), a portion of a first control message, and/or a portion of a second control message (e.g., a second SCI message). The second part 918 may include a second control message, a portion of a first control message, and/or a portion of a second control message.

As shown, the transmitter network node 904 may determine the MAC 1 908 based at least in part on a set 922 of common information bits corresponding to the set 916 of common information included in the first part 914 and a common security key $K_c$ 924. The transmitter network node 904 may determine the MAC 2 910 based at least in part on a set 926 of private information bits corresponding to the set 920 of private information included in the second part 918 and a private security key $K_p$ 928. The MAC 1 908 may correspond to the set 922 of common information bits, and the MAC 2 910 may correspond to the set 926 of private information bits.

As shown by reference number 930, the transmitter network node 904 may encode the at least one control communication to generate at least one control communication. As shown by reference number 932, the transmitter network node 904 may transmit, and the receiver UE 902 may receive, the at least one control communication. In some aspects, the transmitter network node 904 may append the MAC 1 908 and/or the MAC 2 910 to the at least one control communication. In some aspects, for example, the at least one control communication may include a first control communication and a second control communication. The transmitter network node 904 may append the MAC 1 908 to the first control communication and the MAC 2 910 to the second control communication. In some aspects, the transmitter network node 904 may append the MAC 1 908 and the MAC 2 910 to the second control communication. In some aspects, the transmitter network node 904 may transmit at least one shared channel communication that includes the MAC 1 908 and the MAC 2 910. For example, in some aspects, the transmitter network node 904 may transmit a PDSCH communication that includes the MAC 1 908 and the MAC 2 910. In some other aspects, the transmitter network node 904 may transmit a PSSCH communication that includes the MAC 1 908 and the MAC 2 910.

As shown by reference number 934, the receiver UE 902 may determine an authenticity status of the at least one control communication. In some aspects, the receiver UE 902 may decode the at least one control communication to determine a set of decoded common information bits corresponding to the set 922 of common information bits and a set of decoded private information bits corresponding to the set 926 of private information bits. The receiver UE 902 may determine a first authentication code based at least in part on the set of decoded common information bits and the common security key $K_c$ 924. The receiver UE 902 may compare the first authentication code with the MAC 1 908 to determine an authenticity status of the set of decoded common information bits. The receiver UE 902 may determine a second authentication code based at least in part on the set of decoded private information bits and the private security key $K_p$ 928 and may compare the second authentication code with the MAC 2 910 to determine an authenticity status of the set of decoded private information bits.

As indicated above, FIG. 9 is provided as an example. Other examples may differ from what is described with respect to FIG. 9.

Figure 10:
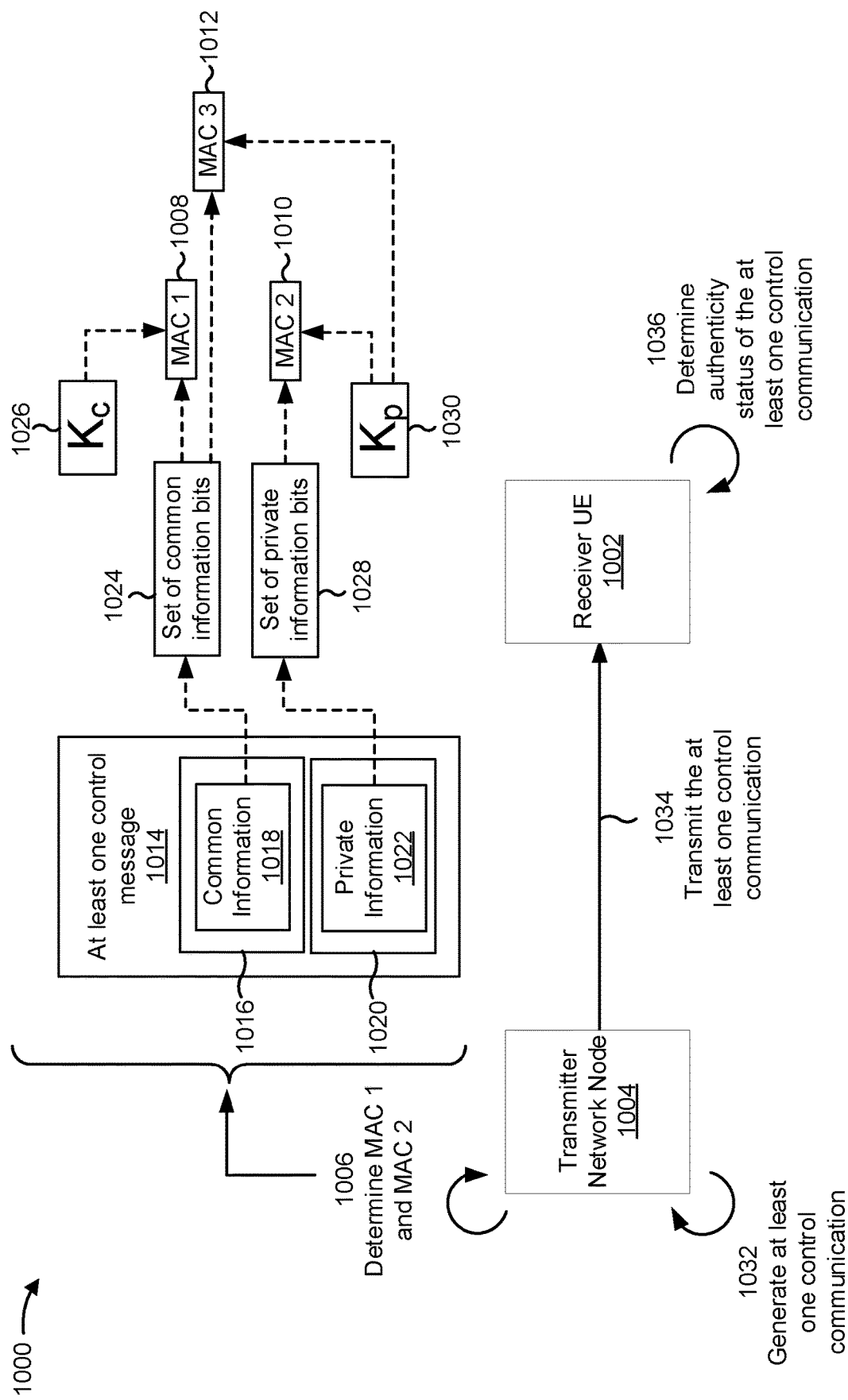

FIG. 10 is a diagram illustrating an example 1000 of protecting control information, in accordance with the present disclosure. As shown in FIG. 10, a receiver UE 1002 and a transmitter network node 1004 may communicate with one another. The receiver UE 1002 and the transmitter network node 1004 may communicate via a wireless network link such as a sidelink or an access link. In some aspects, the receiver UE 1002 may be, or be similar to, the receiver UE 505 depicted in FIG. 5. In some aspects, the transmitter network node 1004 may be, or be similar to, the transmitter network node 510 depicted in FIG. 5.

As shown by reference number 1006, the transmitter network node 1004 may determine a first MAC (shown as "MAC 1") 1008, a second MAC (shown as "MAC 2") 1010, and a third MAC (shown as "MAC 3") 1012 based at least in part on at least one control message 1014. The at least one control message 1014 may include at least one SCI message (e.g., a first SCI message and a second SCI message) or at least one access control information message. In some aspects, the at least one control message 1014 has a first part 1016 that includes a set 1018 of common information (shown as "common information") and a second part 1020 that includes a set 1022 of private information (shown as "private information"). The first part 1016 may include a first control message (e.g., a first SCI message), a portion of a first control message, and/or a portion of a second control message (e.g., a second SCI message). The second part 1020 may include a second control message, a portion of a first control message, and/or a portion of a second control message.

As shown, the transmitter network node 1004 may determine the MAC 1 1008 based at least in part on a set 1024 of common information bits corresponding to the set 1018 of common information included in the first part 1016 and a common security key $K_c$ 1026. The transmitter network node 1004 may determine the MAC 2 1010 based at least in part on a set 1028 of private information bits corresponding to the set 1022 of private information included in the second part 1020 and a private security key $K_p$ 1030. The transmitter network node 1004 may determine the MAC 3 1012 based at least in part on the set 1024 of common information bits corresponding to the set 1018 of common information included in the first part 1016 and the private security key $K_p$ 1030. The MAC 1 1008 may correspond to the set 1024 of common information bits, the MAC 2 1010 may correspond to the set 1028 of private information bits, and the MAC 3 1012 may correspond to the set 1024 of common information bits (and, in some aspects, to the set 1028 of private information bits).

As shown by reference number 1032, the transmitter network node 1004 may encode the at least one control message 1014 to generate at least one control communication. As shown by reference number 1034, the transmitter network node 1004 may transmit, and the receiver UE 1002 may receive, the at least one control communication. In some aspects, the transmitter network node 1004 may append the MAC 1 1008, the MAC 2 1010, and/or the MAC 3 1012 to the at least one control communication. In some aspects, for example, the at least one control communication may include a first control communication and a second control communication. The transmitter network node 1004 may append the MAC 1 1008 to the first control communication, the MAC 2 1010 to the second control communication, and the MAC 3 1012 to the first control communication and/or the second control communication. In some aspects, the transmitter network node 1004 may append the MAC 1 1008, the MAC 2 1010, and the MAC 3 1012 to the second control communication.

In some aspects, the transmitter network node 1004 may transmit at least one shared channel communication that includes the MAC 1 1008, the MAC 2 1010, and the MAC 3 1012. For example, in some aspects, the transmitter network node 1004 may transmit a PDSCH communication that includes the MAC 1 1008, the MAC 2 1010, and the MAC 3 1012. In some other aspects, the transmitter network node 1004 may transmit a PSSCH communication that includes the MAC 1 1008, the MAC 2 1010, and the MAC 3 1012. In some aspects, the transmitter network node 1004 may transmit a third control communication (e.g., a third encoded SCI message) that includes the MAC 1 1008, the MAC 2 1010, and the MAC 3 1012.

As shown by reference number 1036, the receiver UE 1002 may determine an authenticity status of the at least one control communication. In some aspects, the receiver UE 1002 may decode the at least one control communication to determine a set of decoded common information bits corresponding to the set 1024 of common information bits and a set of decoded private information bits corresponding to the set 1028 of private information bits. The receiver UE 1002 may determine a first authentication code based at least in part on the set of decoded common information bits and the common security key $K_c$ 1026. The receiver UE 1002 may compare the first authentication code with the MAC 1 1008 to determine an authenticity status of the set of decoded common information bits. The receiver UE 1002 may determine a second authentication code based at least in part on the set of decoded private information bits and the private security key $K_p$ 1030 and may compare the second authentication code with the MAC 2 1010 to determine an authenticity status of the set of decoded private information bits. The receiver UE 1002 may determine a third authentication code based at least in part on the set of decoded common information bits and the private security key $K_p$ 1030 and may compare the second authentication code with the MAC 3 1012 to determine an authenticity status of the set of decoded common information bits (and/or the set of decoded private information bits).

As indicated above, FIG. 10 is provided as an example. Other examples may differ from what is described with respect to FIG. 10.

Figure 11:
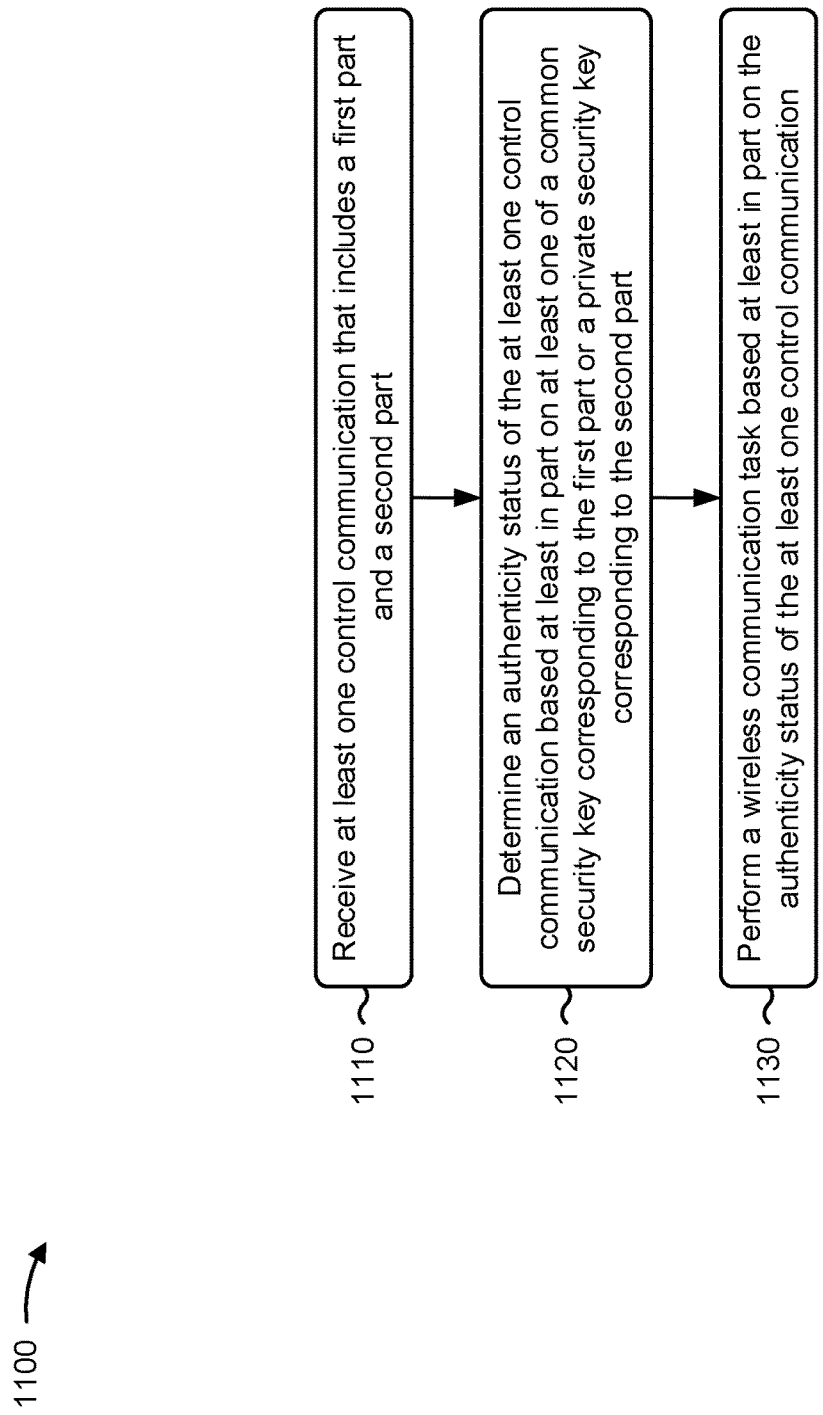
FIGS. 11 and 12 are diagrams illustrating example processes associated with protecting control information, in accordance with the present disclosure.

FIG. 11 is a diagram illustrating an example process 1100 performed, for example, by a receiver UE, in accordance with the present disclosure. Example process 1100 is an example where the receiver UE (e.g., receiver UE 505) performs operations associated with techniques for protecting control information.

As shown in FIG. 11, in some aspects, process 1100 may include receiving at least one control communication that includes a first part and a second part (block 1110). For example, the receiver UE (e.g., using communication manager 1308 and/or reception component 1302, depicted in FIG. 13) may receive at least one control communication that includes a first part and a second part, as described above.

As further shown in FIG. 11, in some aspects, process 1100 may include determining an authenticity status of the at least one control communication based at least in part on at least one of a common security key corresponding to the first part or a private security key corresponding to the second part (block 1120). For example, the receiver UE (e.g., using communication manager 1308 and/or determination component 1310, depicted in FIG. 13) may determine an authenticity status of the at least one control communication based at least in part on at least one of a common security key corresponding to the first part or a private security key corresponding to the second part, as described above.

As further shown in FIG. 11, in some aspects, process 1100 may include performing a wireless communication task based at least in part on the authenticity status of the at least one control communication (block 1130). For example, the receiver UE (e.g., using communication manager 1308, reception component 1302 and/or transmission component 1304, depicted in FIG. 13) may perform a wireless communication task based at least in part on the authenticity status of the at least one control communication, as described above.

Process 1100 may include additional aspects, such as any single aspect or any combination of aspects described below and/or in connection with one or more other processes described elsewhere herein.

In a first aspect, the first part includes a set of encoded common information and the second part includes a set of encoded private information.

In a second aspect, alone or in combination with the first aspect, the at least one control communication comprises a first SCI communication comprising the set of encoded common information, and a second SCI communication comprising the set of encoded private information.

In a third aspect, alone or in combination with one or more of the first and second aspects, the common security key comprises a pre-configured security key.

In a fourth aspect, alone or in combination with one or more of the first through third aspects, process 1100 includes receiving a configuration that indicates the common security key.

In a fifth aspect, alone or in combination with the fourth aspect, the reception of the configuration comprises receiving the configuration from at least one of a base station or a roadside unit.

In a sixth aspect, alone or in combination with one or more of the first through fifth aspects, the reception of the at least one control communication comprises receiving at least one sidelink communication from a transmitter UE, and the receiver UE is an intended recipient of the at least one sidelink communication, and process 1100 includes deriving the private security key.

In a seventh aspect, alone or in combination with the sixth aspect, the receiver UE comprises at least one of an intended unicast recipient of the at least one sidelink communication or an intended groupcast recipient of the at least one sidelink communication, and the private security key is based at least in part on the receiver UE comprising the at least one of the intended unicast recipient of the at least one sidelink communication or the intended groupcast recipient of the at least one sidelink communication.

In an eighth aspect, alone or in combination with one or more of the sixth or seventh aspects, the receiver UE is located within a specified distance of the transmitter UE, and the private security key is based at least in part on the receiver UE being located within the specified distance of the transmitter UE.

In a ninth aspect, alone or in combination with one or more of the sixth through eighth aspects, the private security key is based at least in part on a configured higher layer key.

In a tenth aspect, alone or in combination with the ninth aspect, the configured higher layer key comprises at least one of an RRC integrity protection key, an RRC signal ciphering key, or an NG-RAN cryptographic key.

In an eleventh aspect, alone or in combination with the tenth aspect, the private security key is based at least in part on a key derivation function, wherein the key derivation function is a function of the NG-RAN cryptographic key, a current slot number, and a set of signaling parameters.

In a twelfth aspect, alone or in combination with the eleventh aspect, the derivation of the private security key comprises deriving the private security key for a first slot, and process 1100 includes deriving an additional private security key for a second slot.

In a thirteenth aspect, alone or in combination with one or more of the sixth through twelfth aspects, the private security key is based at least in part on one or more physical channel characteristics associated with the at least one sidelink communication.

In a fourteenth aspect, alone or in combination with one or more of the sixth through thirteenth aspects, the at least one sidelink communication is a unicast communication, and the private security key is based at least in part on a channel reciprocity between the transmitter UE and the receiver UE.

In a fifteenth aspect, alone or in combination with one or more of the sixth through fourteenth aspects, the private security key is based at least in part on a configured higher layer key and one or more physical channel characteristics associated with the at least one sidelink communication.

In a sixteenth aspect, alone or in combination with one or more of the first through fifteenth aspects, the determination of the authenticity status of the at least one control communication comprises determining an authenticity status of the at least one control communication based at least in part on at least one MAC.

In a seventeenth aspect, alone or in combination with one or more of the first through sixteenth aspects, the at least one control communication comprises a first SCI communication and a second SCI communication, and the at least one MAC comprises a first MAC corresponding to the first SCI communication and a second MAC corresponding to the second SCI communication.

In an eighteenth aspect, alone or in combination with the seventeenth aspect, the first MAC is based at least in part on the common security key and one or more information bits associated with the first SCI communication, and the second MAC is based at least in part on the private security key and one or more information bits associated with the second SCI communication.

In a nineteenth aspect, alone or in combination with the eighteenth aspect, the first SCI communication corresponds to a first SCI message comprising a first set of specified data fields that include the one or more information bits associated with the first SCI communication, and the second SCI communication corresponds to a second SCI message comprising a second set of specified data fields that include the one or more information bits associated with the second SCI communication.

In a twentieth aspect, alone or in combination with the nineteenth aspect, the first SCI message comprises a first dedicated data field that includes the first MAC, and the second SCI message comprises a second dedicated data field that includes the second MAC.

In a twenty-first aspect, alone or in combination with the twentieth aspect, the determination of the authenticity status of the at least one control communication comprises decoding the first SCI communication to determine a first set of decoded data fields corresponding to the first set of specified data fields, wherein the first set of decoded data fields excludes the first dedicated data field, determining a first authentication code based at least in part on the first set of decoded data fields and the common security key, comparing the first authentication code with the first MAC to determine an authenticity status of the first SCI communication, decoding the second SCI communication to determine a second set of decoded data fields corresponding to the second set of specified data fields, wherein the second set of decoded data fields excludes the second dedicated data field, determining a second authentication code based at least in part on the second set of decoded data fields and the private security key, and comparing the second authentication code with the second MAC to determine an authenticity status of the second SCI communication.

In a twenty-second aspect, alone or in combination with the twenty-first aspect, the second SCI communication comprises a first dedicated data field that includes the first MAC, and the second SCI communication comprises a second dedicated data field that includes the second MAC.

In a twenty-third aspect, alone or in combination with the twenty-second aspect, the determination of the authenticity status of the at least one control communication comprises decoding the first SCI communication to determine a first set of decoded data fields corresponding to the first set of specified data fields, determining a first authentication code based at least in part on the first set of decoded data fields and the common security key, comparing the first authentication code with the first MAC to determine an authenticity status of the first SCI communication, decoding the second SCI communication to determine a second set of decoded data fields corresponding to the second set of specified data fields, wherein the second set of decoded data fields excludes the first dedicated data field and the second dedicated data field, determining a second authentication code based at least in part on the second set of decoded data fields and the private security key, and comparing the second authentication code with the second MAC to determine an authenticity status of the second SCI communication.

In a twenty-fourth aspect, alone or in combination with one or more of the nineteenth through twenty-third aspects, the at least one MAC comprises a third MAC based at least in part on the private security key and the one or more information bits associated with the first SCI communication.

In a twenty-fifth aspect, alone or in combination with the twenty-fourth aspect, the third MAC is carried in a dedicated data field in the first SCI communication or the second SCI communication.

In a twenty-sixth aspect, alone or in combination with the twenty-fifth aspect, the determination of the authenticity status of the at least one control communication comprises decoding the first SCI communication to determine a first set of decoded data fields corresponding to the first set of specified data fields, wherein the first set of decoded data fields excludes the first dedicated data field, determining a first authentication code based at least in part on the first set of decoded data fields and the common security key, comparing the first authentication code with the first MAC to determine an authenticity status of the first SCI communication, decoding the second SCI communication to determine a second set of decoded data fields corresponding to the second set of specified data fields, wherein the second set of decoded data fields excludes the second dedicated data field, determining a second authentication code based at least in part on the second set of decoded data fields and the private security key, comparing the second authentication code with the second MAC to determine an authenticity status of the second SCI communication, determining a third authentication code based at least in part on the first set of decoded data fields and the private security key, and comparing the third authentication code with the third MAC to determine an authenticity status of the second SCI communication.

In a twenty-seventh aspect, alone or in combination with one or more of the seventeenth through twenty-sixth aspects, the first MAC is based at least in part on the common security key and a first set of encoded bits associated with the first SCI communication, and the second MAC is based at least in part on the private security key and a second set of encoded bits associated with the second SCI communication.

In a twenty-eighth aspect, alone or in combination with the twenty-seventh aspect, the first MAC is appended to the first set of encoded bits, and wherein the second MAC is appended to the second set of encoded bits.

In a twenty-ninth aspect, alone or in combination with one or more of the seventeenth through twenty-eighth aspects, the first MAC is based at least in part on a first set of encoded bits associated with the first SCI communication, and the second MAC is based at least in part on the first set of encoded bits.

In a thirtieth aspect, alone or in combination with the twenty-ninth aspect, the first MAC is appended to a second set of encoded bits associated with the second SCI communication, and the second MAC is appended to the second set of encoded bits.

In a thirty-first aspect, alone or in combination with one or more of the twenty-ninth or thirtieth aspects, the determination of the authenticity status of the at least one control communication comprises decoding the first SCI communication to determine a first set of decoded data fields corresponding to a first set of specified data fields associated with the first SCI communication, wherein the first set of decoded data fields excludes the first MAC, determining a first authentication code based at least in part on the first set of decoded data fields and the common security key, comparing the first authentication code with the first MAC to determine an authenticity status of the first SCI communication, decoding the second SCI communication to determine a second set of decoded data fields corresponding to a second set of specified data fields associated with the second SCI communication, wherein the second set of decoded data fields excludes the second MAC, determining a second authentication code based at least in part on the second set of decoded data fields and the private security key, and comparing the second authentication code with the second MAC to determine an authenticity status of the second SCI communication.

In a thirty-second aspect, alone or in combination with one or more of the sixteenth through thirty-first aspects, the at least one control communication comprises a set of encoded common information corresponding to a set of common information associated with the first part and a set of encoded private information corresponding to a set of private information associated with the second part, and the at least one MAC comprises a first MAC corresponding to the set of common information and a second MAC corresponding to the set of private information.

In a thirty-third aspect, alone or in combination with the thirty-second aspect, the first MAC is based at least in part on the set of common information and the common security key, and wherein the second MAC is based at least in part on the set of private information and the private security key.

In a thirty-fourth aspect, alone or in combination with one or more of the thirty-second or thirty-third aspects, process 1100 includes receiving at least one physical sidelink shared channel communication that includes the first MAC and the second MAC.

In a thirty-fifth aspect, alone or in combination with one or more of the thirty-second through thirty-fourth aspects, the determination of the authenticity status of the at least one control communication comprises decoding the at least one control communication to determine a set of decoded common information corresponding to the set of common information and a set of decoded private information corresponding to the set of private information, determining a first authentication code based at least in part on the set of decoded common information and the common security key, comparing the first authentication code with the first MAC to determine an authenticity status of the set of encoded common information, determining a second authentication code based at least in part on the set of decoded private information and the private security key, and comparing the second authentication code with the second MAC to determine an authenticity status of the set of encoded private information.

In a thirty-sixth aspect, alone or in combination with one or more of the thirty-second through thirty-fifth aspects, the at least one MAC further comprises a third MAC based at least in part on the set of common information and the private security key.

In a thirty-seventh aspect, alone or in combination with the thirty-sixth aspect, the determination of the authenticity status of the at least one control communication comprises decoding the at least one control communication to determine a set of decoded common information corresponding to the set of common information and a set of decoded private information corresponding to the set of private information, determining a first authentication code based at least in part on the set of decoded common information and the common security key, comparing the first authentication code with the first MAC to facilitate determining the authenticity status of the at least one sidelink communication, determining a second authentication code based at least in part on the set of decoded private information and the private security key, comparing the second authentication code with the second MAC to facilitate determining the authenticity status of the at least one sidelink communication, determining a third authentication code based at least in part on the set of decoded common information and the private security key, and comparing the third authentication code with the third MAC to facilitate determining the authenticity status of the at least one control communication.

In a thirty-eighth aspect, alone or in combination with one or more of the sixteenth through thirty-seventh aspects, the at least one control communication comprises a first SCI communication, a second SCI communication, and a third SCI communication, and the third SCI communication comprises information associated with the at least one MAC.

In a thirty-ninth aspect, alone or in combination with the thirty-eighth aspect, the second SCI communication indicates at least one parameter for decoding the third SCI communication.

In a fortieth aspect, alone or in combination with the thirty-ninth aspect, the determination of the authenticity status of the at least one control communication comprises decoding the first SCI communication to determine a format of the second SCI communication, decoding the second SCI communication, based at least in part on the format of the second SCI communication, to determine the at least one parameter for decoding the third SCI communication, decoding the third SCI communication, based at least in part on the at least one parameter, to determine the information associated with the at least one MAC, determining at least one authentication code based at least in part on the information associated with the at least one MAC, and comparing the at least one authentication code with the at least one MAC to determine the authenticity status of the at least one control communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
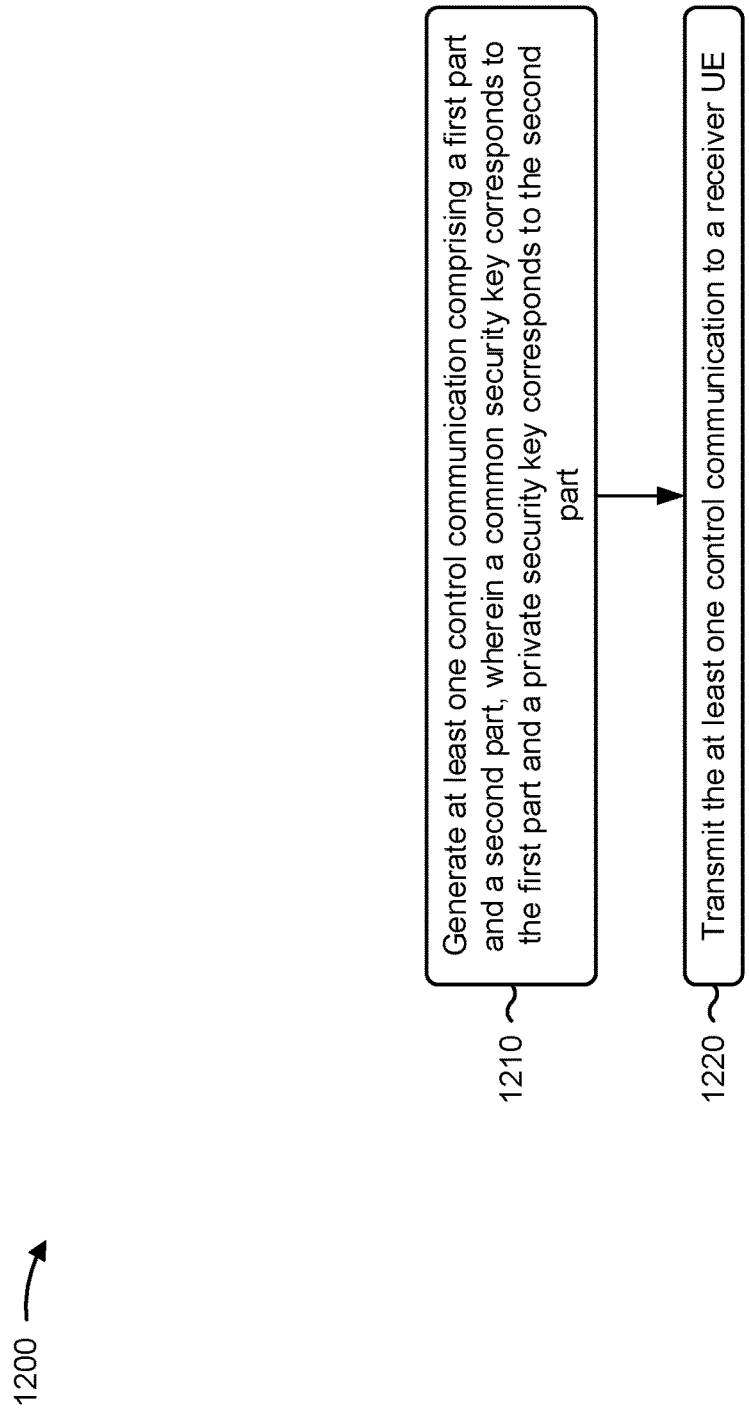

FIG. 12 is a diagram illustrating an example process 1200 performed, for example, by a transmitter network node, in accordance with the present disclosure. Example process 1200 is an example where the transmitter network node (e.g., transmitter network node 510) performs operations associated with techniques for protecting control information.

As shown in FIG. 12, in some aspects, process 1200 may include generating at least one control communication comprising a first part and a second part, wherein a common security key corresponds to the first part and a private security key corresponds to the second part (block 1210). For example, the transmitter network node (e.g., using communication manager 1408 and/or generation component 1412, depicted in FIG. 14) may generate at least one control communication comprising a first part and a second part, wherein a common security key corresponds to the first part and a private security key corresponds to the second part, as described above.

As further shown in FIG. 12, in some aspects, process 1200 may include transmitting the at least one control communication to a receiver UE (block 1220). For example, the transmitter network node (e.g., using communication manager 1408 and/or transmission component 1404, depicted in FIG. 14) may transmit the at least one control communication to a receiver UE, as described above.

Process 1200 may include additional aspects, such as any single aspect or any combination of aspects described below and/or in connection with one or more other processes described elsewhere herein.

In a first aspect, the first part includes a set of encoded common information and the second part includes a set of encoded private information.

In a second aspect, alone or in combination with the first aspect, the at least one control communication comprises a first SCI communication comprising the set of encoded common information, and a second SCI communication comprising the set of encoded private information.

In a third aspect, alone or in combination with one or more of the first and second aspects, the common security key comprises a pre-configured security key.

In a fourth aspect, alone or in combination with one or more of the first through third aspects, process 1200 includes transmitting a configuration that indicates the common security key.

In a fifth aspect, alone or in combination with the fourth aspect, the transmitter network node comprises at least one of a base station or a roadside unit.

In a sixth aspect, alone or in combination with one or more of the first through fifth aspects, the transmitter network node comprises a transmitter UE, and the receiver UE is an intended recipient of the at least one control communication, the at least one control communication comprising at least one sidelink communication.

In a seventh aspect, alone or in combination with the sixth aspect, the receiver UE comprises at least one of an intended unicast recipient of the at least one sidelink communication or an intended groupcast recipient of the at least one sidelink communication, wherein the private security key is based at least in part on the receiver UE comprising the at least one of the intended unicast recipient of the at least one sidelink communication or the intended groupcast recipient of the at least one sidelink communication.

In an eighth aspect, alone or in combination with one or more of the sixth or seventh aspects, the receiver UE is located within a specified distance of the transmitter network node, and the private security key is based at least in part on the receiver UE being located within the specified distance of the transmitter network node.

In a ninth aspect, alone or in combination with one or more of the sixth through eighth aspects, the private security key is based at least in part on a configured higher layer key.

In a tenth aspect, alone or in combination with the ninth aspect, the configured higher layer key comprises at least one of an RRC integrity protection key, an RRC signal ciphering key, or an NG-RAN cryptographic key.

In an eleventh aspect, alone or in combination with the tenth aspect, the private security key is based at least in part on a key derivation function, wherein the key derivation function is a function of the NG-RAN cryptographic key, a current slot number, and a set of signaling parameters.

In a twelfth aspect, alone or in combination with the eleventh aspect, the private security key corresponds to a first slot and an additional private security key corresponds to a second slot.

In a thirteenth aspect, alone or in combination with one or more of the sixth through twelfth aspects, the private security key is based at least in part on one or more physical channel characteristics associated with the at least one sidelink communication.

In a fourteenth aspect, alone or in combination with one or more of the sixth through thirteenth aspects, the at least one sidelink communication is a unicast communication, and the private security key is based at least in part on a channel reciprocity between the transmitter UE and the receiver UE.

In a fifteenth aspect, alone or in combination with one or more of the sixth through fourteenth aspects, the private security key is based at least in part on a configured higher layer key and one or more physical channel characteristics associated with the at least one sidelink communication.

In a sixteenth aspect, alone or in combination with one or more of the first through fifteenth aspects, process 1200 includes transmitting, to the receiver UE, at least one MAC.

In a seventeenth aspect, alone or in combination with the sixteenth aspect, the at least one control communication comprises a first SCI communication and a second SCI communication, and the at least one MAC comprises a first MAC corresponding to the first SCI communication and a second MAC corresponding to the second SCI communication.

In an eighteenth aspect, alone or in combination with the seventeenth aspect, the first MAC is based at least in part on the common security key and one or more information bits associated with the first SCI communication, and the second MAC is based at least in part on the private security key and one or more information bits associated with the second SCI communication.

In a nineteenth aspect, alone or in combination with the eighteenth aspect, the first SCI communication corresponds to a first SCI message comprising a first set of specified data fields that include the one or more information bits associated with the first SCI communication, and the second SCI communication corresponds to a second SCI message comprising a second set of specified data fields that include the one or more information bits associated with the second SCI communication.

In a twentieth aspect, alone or in combination with the nineteenth aspect, the first SCI message comprises a first dedicated data field that includes the first MAC, and the second SCI message comprises a second dedicated data field that includes the second MAC.

In a twenty-first aspect, alone or in combination with the nineteenth aspect, the at least one MAC comprises a third MAC based at least in part on the private security key and the one or more information bits associated with the first SCI communication.

In a twenty-second aspect, alone or in combination with the twenty-first aspect, the third MAC is carried in a dedicated data field in the first SCI communication or the second SCI communication.

In a twenty-third aspect, alone or in combination with one or more of the seventeenth through twenty-second aspects, the first MAC is based at least in part on the common security key and a first set of encoded bits associated with the first SCI communication, and the second MAC is based at least in part on the private security key and a second set of encoded bits associated with the second SCI communication.

In a twenty-fourth aspect, alone or in combination with the twenty-third aspect, the first MAC is appended to the first set of encoded bits, and the second MAC is appended to the second set of encoded bits.

In a twenty-fifth aspect, alone or in combination with one or more of the seventeenth through twenty-fourth aspects, the first MAC is based at least in part on a first set of encoded bits associated with the first SCI communication, and the second MAC is based at least in part on the first set of encoded bits.

In a twenty-sixth aspect, alone or in combination with the twenty-fifth aspect, the first MAC is appended to a second set of encoded bits associated with the second SCI communication, and the second MAC is appended to the second set of encoded bits.

In a twenty-seventh aspect, alone or in combination with one or more of the sixteenth through twenty-sixth aspects, the at least one control communication comprises a set of encoded common information corresponding to a set of common information associated with the first part and a set of encoded private information corresponding to a set of private information associated with the second part, and the at least one MAC comprises a first MAC corresponding to the set of common information and a second MAC corresponding to the set of private information.

In a twenty-eighth aspect, alone or in combination with the twenty-seventh aspect, the first MAC is based at least in part on the set of common information and the common security key, and the second MAC is based at least in part on the set of private information and the private security key.

In a twenty-ninth aspect, alone or in combination with the twenty-eighth aspect, process 1200 includes transmitting at least one physical sidelink shared channel communication that includes the first MAC and the second MAC.

In a thirtieth aspect, alone or in combination with one or more of the twenty-eighth or twenty-ninth aspects, the at least one MAC further comprises a third MAC based at least in part on the set of common information and the private security key.

In a thirty-first aspect, alone or in combination with one or more of the sixteenth through thirtieth aspects, the at least one control communication comprises a first SCI communication, a second SCI communication, and a third SCI communication, and the third SCI communication comprises information associated with the at least one MAC.

In a thirty-second aspect, alone or in combination with the thirty-first aspect, the second SCI communication indicates at least one parameter for decoding the third SCI communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
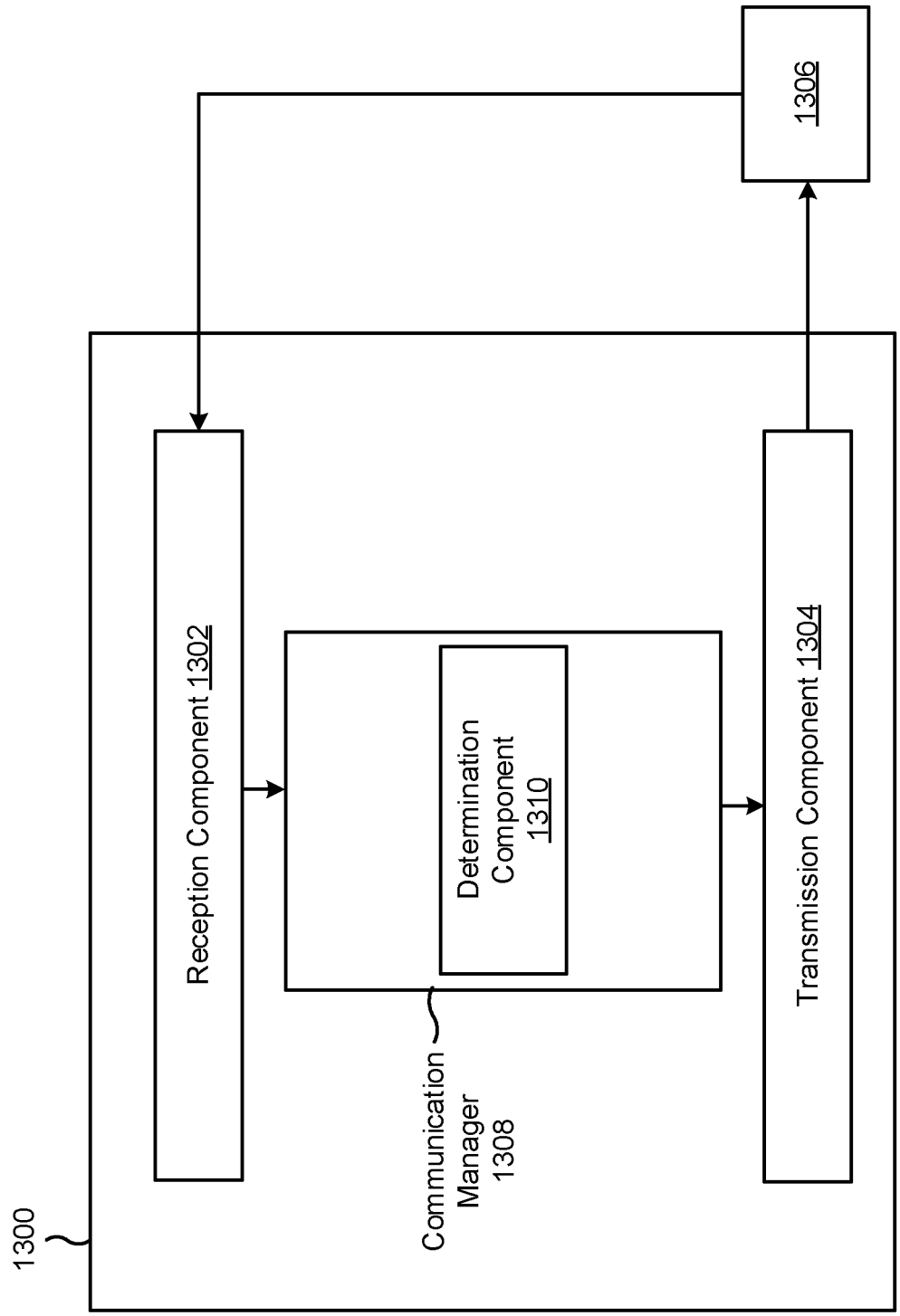
FIGS. 13 and 14 are diagrams of example apparatuses for wireless communication, in accordance with the present disclosure.

FIG. 13 is a diagram of an example apparatus 1300 for wireless communication. The apparatus 1300 may be a UE (e.g., a receiver UE), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308. The communication manager 1308 may include a determination component 1310.

In some aspects, the apparatus 1300 may be configured to perform one or more operations described herein in connection with FIGS. 5-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive at least one control communication that includes a first part and a second part. The determination component 1310 may determine an authenticity status of the at least one control communication based at least in part on at least one of a common security key corresponding to the first part or a private security key corresponding to the second part. The communication manager 1308, the reception component 1302, and/or the transmission component 1304 may perform a wireless communication task based at least in part on the authenticity status of the at least one control communication. In some aspects, the communication manager 1308 may be, or be similar to, the communication manager 140 depicted in FIGS. 1 and 2. In some aspects, the communication manager 1308 may include one or more antennas, a modem, a controller/processor, a memory, or a combination thereof, of the UE described in connection with FIG. 2. In some aspects, the communication manager 1308 may include the reception component 1302 and/or the transmission component 1304. In some aspects, the determination component 1310 may include one or more antennas, a modem, a controller/processor, a memory, or a combination thereof, of the UE described in connection with FIG. 2. In some aspects, the determination component 1310 may include the reception component 1302 and/or the transmission component 1304.

The reception component 1302 may receive a configuration that indicates a common security key. The reception component 1302 may receive at least one MAC. For example, the reception component 1302 may receive at least one physical sidelink shared channel communication that includes a first MAC and a second MAC.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
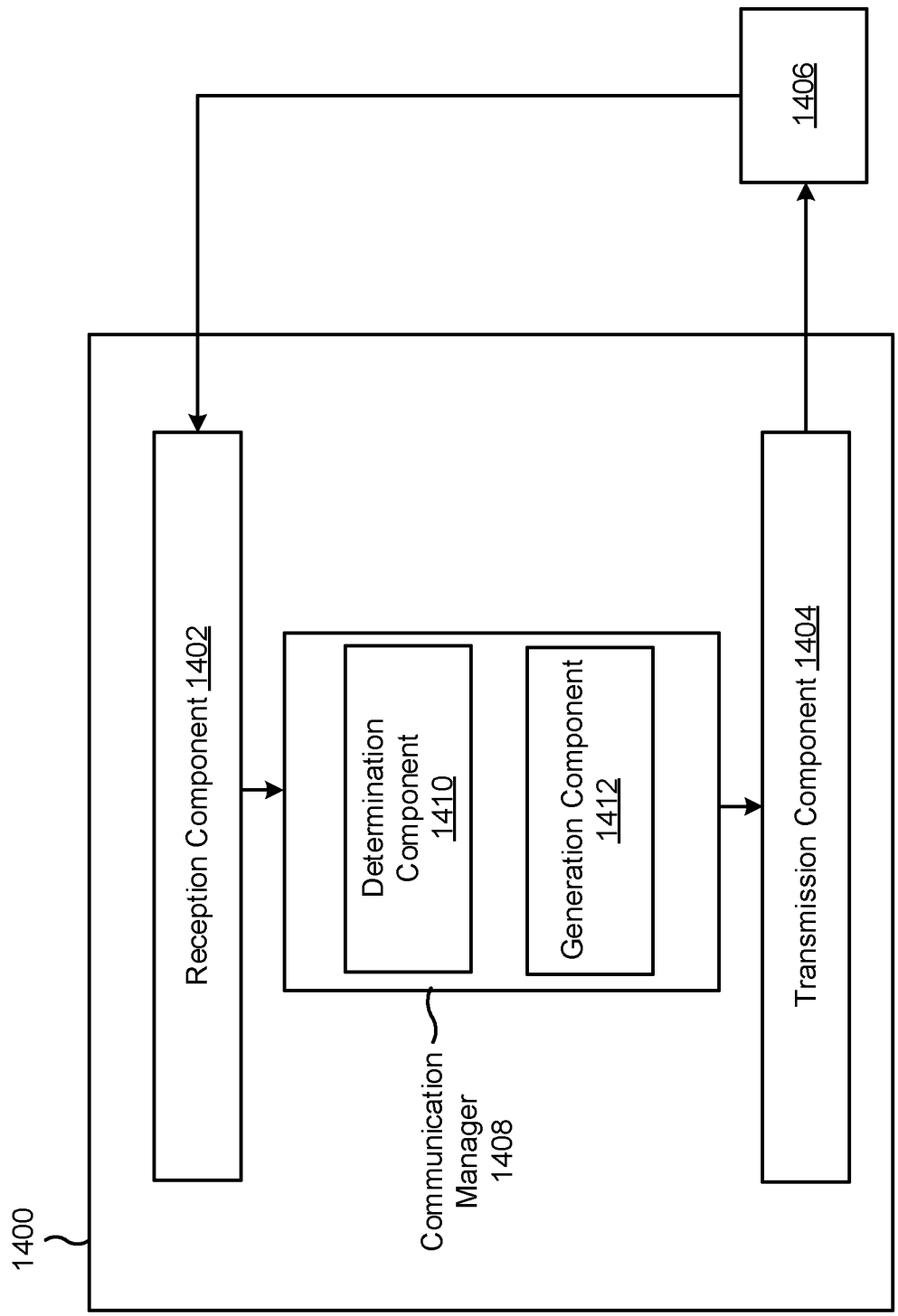

FIG. 14 is a diagram of an example apparatus 1400 for wireless communication. The apparatus 1400 may be a network node (e.g., a transmitter network node), or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1408. The communication manager 1408 may include one or more of a determination component 1410, a generation component 1412, or a combination thereof.

In some aspects, the apparatus 1400 may be configured to perform one or more operations described herein in connection with FIGS. 5-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The communication manager 1408 and/or the determination component 1410 may determine at least one MAC. The communication manager 1408 and/or the generation component 1412 may generate at least one control communication comprising a first part and a second part, wherein a common security key corresponds to the first part and a private security key corresponds to the second part. In some aspects, the communication manager 1408 may be, or be similar to, the communication manager 140 depicted in FIGS. 1 and 2. In some aspects, the communication manager 1408 may be, or be similar to, the communication manager 150 depicted in FIGS. 1 and 2. In some aspects, the communication manager 1408 may include one or more antennas, a modem, a controller/processor, a memory, or a combination thereof, of the UE or the base station described in connection with FIG. 2. In some aspects, the communication manager 1408 may include the reception component 1402 and/or the transmission component 1404.

In some aspects, the determination component 1410 may include one or more antennas, a modem, a controller/processor, a memory, or a combination thereof, of the UE or the base station described in connection with FIG. 2. In some aspects, the determination component 1410 may include the reception component 1402 and/or the transmission component 1404. In some aspects, the generation component 1412 may include one or more antennas, a modem, a controller/processor, a memory, or a combination thereof, of the UE or the base station described in connection with FIG. 2. In some aspects, the generation component 1412 may include the reception component 1402 and/or the transmission component 1404.

The transmission component 1404 may transmit a configuration that indicates the common security key. The transmission component 1404 may transmit the at least one control communication to a receiver UE. The transmission component 1404 may transmit, to the receiver UE, at least one MAC. The transmission component 1404 may transmit at least one PSSCH communication that includes a first MAC and a second MAC.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Aspect 1: A method of wireless communication performed by a receiver user equipment (UE), comprising: receiving at least one control communication that includes a first part and a second part; determining an authenticity status of the at least one control communication based at least in part on at least one of a common security key corresponding to the first part or a private security key corresponding to the second part; and performing a wireless communication task based at least in part on the authenticity status of the at least one control communication.

Aspect 2: The method of Aspect 1, wherein the first part includes a set of encoded common information and the second part includes a set of encoded private information.

Aspect 3: The method of Aspect 2, wherein the at least one control communication comprises: a first sidelink control information (SCI) communication comprising the set of encoded common information; and a second SCI communication comprising the set of encoded private information.

Aspect 4: The method of any of Aspects 1-3, wherein the common security key comprises a pre-configured security key.

Aspect 5: The method of any of Aspects 1-4, further comprising receiving a configuration that indicates the common security key.

Aspect 6: The method of Aspect 5, wherein the reception of the configuration comprises receiving the configuration from at least one of a base station or a roadside unit.

Aspect 7: The method of any of Aspects 1-6, wherein the reception of the at least one control communication comprises receiving at least one sidelink communication from a transmitter UE, wherein the receiver UE is an intended recipient of the at least one sidelink communication, the method further comprising deriving the private security key.

Aspect 8: The method of Aspect 7, wherein the receiver UE comprises at least one of an intended unicast recipient of the at least one sidelink communication or an intended groupcast recipient of the at least one sidelink communication, wherein the private security key is based at least in part on the receiver UE comprising the at least one of the intended unicast recipient of the at least one sidelink communication or the intended groupcast recipient of the at least one sidelink communication.

Aspect 9: The method of either of Aspects 7 or 8, wherein the receiver UE is located within a specified distance of the transmitter UE, and wherein the private security key is based at least in part on the receiver UE being located within the specified distance of the transmitter UE.

Aspect 10: The method of any of Aspects 7-9, wherein the private security key is based at least in part on a configured higher layer key.

Aspect 11: The method of Aspect 10, wherein the configured higher layer key comprises at least one of: a radio resource control (RRC) integrity protection key, an RRC signal ciphering key, or a Next Generation Radio Access Network (NG-RAN) cryptographic key.

Aspect 12: The method of Aspect 11, wherein the private security key is based at least in part on a key derivation function, wherein the key derivation function is a function of the NG-RAN cryptographic key, a current slot number, and a set of signaling parameters.

Aspect 13: The method of Aspect 12, wherein the derivation of the private security key comprises deriving the private security key for a first slot, and wherein the method further comprises deriving an additional private security key for a second slot.

Aspect 14: The method of any of Aspects 7-13, wherein the private security key is based at least in part on one or more physical channel characteristics associated with the at least one sidelink communication.

Aspect 15: The method of any of Aspects 7-14, wherein the at least one sidelink communication is a unicast communication, and wherein the private security key is based at least in part on a channel reciprocity between the transmitter UE and the receiver UE.

Aspect 16: The method of any of Aspects 7-15, wherein the private security key is based at least in part on a configured higher layer key and one or more physical channel characteristics associated with the at least one sidelink communication.

Aspect 17: The method of any of Aspects 1-16, wherein the determination of the authenticity status of the at least one control communication comprises determining an authenticity status of the at least one control communication based at least in part on at least one message authentication code (MAC).

Aspect 18: The method of Aspect 17, wherein the at least one control communication comprises a first sidelink control information (SCI) communication and a second SCI communication, and wherein the at least one MAC comprises a first MAC corresponding to the first SCI communication and a second MAC corresponding to the second SCI communication.

Aspect 19: The method of Aspect 18, wherein the first MAC is based at least in part on the common security key and one or more information bits associated with the first SCI communication, and wherein the second MAC is based at least in part on the private security key and one or more information bits associated with the second SCI communication.

Aspect 20: The method of Aspect 19, wherein the first SCI communication corresponds to a first SCI message comprising a first set of specified data fields that include the one or more information bits associated with the first SCI communication, and wherein the second SCI communication corresponds to a second SCI message comprising a second set of specified data fields that include the one or more information bits associated with the second SCI communication.

Aspect 21: The method of Aspect 20, wherein the first SCI message comprises a first dedicated data field that includes the first MAC, and wherein the second SCI message comprises a second dedicated data field that includes the second MAC.

Aspect 22: The method of Aspect 21, wherein the determination of the authenticity status of the at least one control communication comprises: decoding the first SCI communication to determine a first set of decoded data fields corresponding to the first set of specified data fields, wherein the first set of decoded data fields excludes the first dedicated data field; determining a first authentication code based at least in part on the first set of decoded data fields and the common security key; comparing the first authentication code with the first MAC to determine an authenticity status of the first SCI communication; decoding the second SCI communication to determine a second set of decoded data fields corresponding to the second set of specified data fields, wherein the second set of decoded data fields excludes the second dedicated data field; determining a second authentication code based at least in part on the second set of decoded data fields and the private security key; and comparing the second authentication code with the second MAC to determine an authenticity status of the second SCI communication.

Aspect 23: The method of Aspect 20, wherein the second SCI communication comprises a first dedicated data field that includes the first MAC, and wherein the second SCI communication comprises a second dedicated data field that includes the second MAC.

Aspect 24: The method of Aspect 23, wherein the determination of the authenticity status of the at least one control communication comprises: decoding the first SCI communication to determine a first set of decoded data fields corresponding to the first set of specified data fields; determining a first authentication code based at least in part on the first set of decoded data fields and the common security key; comparing the first authentication code with the first MAC to determine an authenticity status of the first SCI communication; decoding the second SCI communication to determine a second set of decoded data fields corresponding to the second set of specified data fields, wherein the second set of decoded data fields excludes the first dedicated data field and the second dedicated data field; determining a second authentication code based at least in part on the second set of decoded data fields and the private security key; and comparing the second authentication code with the second MAC to determine an authenticity status of the second SCI communication.

Aspect 25: The method of any of Aspects 20-24, wherein the at least one MAC comprises a third MAC based at least in part on the private security key and the one or more information bits associated with the first SCI communication.

Aspect 26: The method of Aspect 25, wherein the third MAC is carried in a dedicated data field in the first SCI communication or the second SCI communication.

Aspect 27: The method of Aspect 26, wherein the determination of the authenticity status of the at least one control communication comprises: decoding the first SCI communication to determine a first set of decoded data fields corresponding to the first set of specified data fields, wherein the first set of decoded data fields excludes the first dedicated data field; determining a first authentication code based at least in part on the first set of decoded data fields and the common security key; comparing the first authentication code with the first MAC to determine an authenticity status of the first SCI communication; decoding the second SCI communication to determine a second set of decoded data fields corresponding to the second set of specified data fields, wherein the second set of decoded data fields excludes the second dedicated data field; determining a second authentication code based at least in part on the second set of decoded data fields and the private security key; comparing the second authentication code with the second MAC to determine an authenticity status of the second SCI communication; determining a third authentication code based at least in part on the first set of decoded data fields and the private security key; and comparing the third authentication code with the third MAC to determine an authenticity status of the second SCI communication.

Aspect 28: The method of any of Aspects 18-27, wherein the first MAC is based at least in part on the common security key and a first set of encoded bits associated with the first SCI communication, and wherein the second MAC is based at least in part on the private security key and a second set of encoded bits associated with the second SCI communication.

Aspect 29: The method of Aspect 28, wherein the first MAC is appended to the first set of encoded bits, and wherein the second MAC is appended to the second set of encoded bits.

Aspect 30: The method of any of Aspects 18-29, wherein the first MAC is based at least in part on a first set of encoded bits associated with the first SCI communication, and wherein the second MAC is based at least in part on the first set of encoded bits.

Aspect 31: The method of Aspect 30, wherein the first MAC is appended to a second set of encoded bits associated with the second SCI communication, and wherein the second MAC is appended to the second set of encoded bits.

Aspect 32: The method of either of Aspects 30 or 31, wherein the determination of the authenticity status of the at least one control communication comprises: decoding the first SCI communication to determine a first set of decoded data fields corresponding to a first set of specified data fields associated with the first SCI communication, wherein the first set of decoded data fields excludes the first MAC; determining a first authentication code based at least in part on the first set of decoded data fields and the common security key; comparing the first authentication code with the first MAC to determine an authenticity status of the first SCI communication; decoding the second SCI communication to determine a second set of decoded data fields corresponding to a second set of specified data fields associated with the second SCI communication, wherein the second set of decoded data fields excludes the second MAC; determining a second authentication code based at least in part on the second set of decoded data fields and the private security key; and comparing the second authentication code with the second MAC to determine an authenticity status of the second SCI communication.

Aspect 33: The method of any of Aspects 17-32, wherein the at least one control communication comprises a set of encoded common information corresponding to a set of common information associated with the first part and a set of encoded private information corresponding to a set of private information associated with the second part, and wherein the at least one MAC comprises a first MAC corresponding to the set of common information and a second MAC corresponding to the set of private information.

Aspect 34: The method of Aspect 33, wherein the first MAC is based at least in part on the set of common information and the common security key, and wherein the second MAC is based at least in part on the set of private information and the private security key.

Aspect 35: The method of either of Aspects 33 or 34, further comprising receiving at least one physical sidelink shared channel communication that includes the first MAC and the second MAC.

Aspect 36: The method of any of Aspects 33-35, wherein the determination of the authenticity status of the at least one control communication comprises: decoding the at least one control communication to determine a set of decoded common information corresponding to the set of common information and a set of decoded private information corresponding to the set of private information; determining a first authentication code based at least in part on the set of decoded common information and the common security key; comparing the first authentication code with the first MAC to determine an authenticity status of the set of encoded common information; determining a second authentication code based at least in part on the set of decoded private information and the private security key; and comparing the second authentication code with the second MAC to determine an authenticity status of the set of encoded private information.

Aspect 37: The method of any of Aspects 33-36, wherein the at least one MAC further comprises a third MAC based at least in part on the set of common information and the private security key.

Aspect 38: The method of Aspect 37, wherein the determination of the authenticity status of the at least one control communication comprises: decoding the at least one control communication to determine a set of decoded common information corresponding to the set of common information and a set of decoded private information corresponding to the set of private information; determining a first authentication code based at least in part on the set of decoded common information and the common security key; comparing the first authentication code with the first MAC to facilitate determining the authenticity status of the at least one sidelink communication; determining a second authentication code based at least in part on the set of decoded private information and the private security key; comparing the second authentication code with the second MAC to facilitate determining the authenticity status of the at least one sidelink communication; determining a third authentication code based at least in part on the set of decoded common information and the private security key; and comparing the third authentication code with the third MAC to facilitate determining the authenticity status of the at least one control communication.

Aspect 39: The method of any of Aspects 17-38, wherein the at least one control communication comprises a first sidelink control information (SCI) communication, a second SCI communication, and a third SCI communication, and wherein the third SCI communication comprises information associated with the at least one MAC.

Aspect 40: The method of Aspect 39, wherein the second SCI communication indicates at least one parameter for decoding the third SCI communication.

Aspect 41: The method of Aspect 40, wherein the determination of the authenticity status of the at least one control communication comprises: decoding the first SCI communication to determine a format of the second SCI communication; decoding the second SCI communication, based at least in part on the format of the second SCI communication, to determine the at least one parameter for decoding the third SCI communication; decoding the third SCI communication, based at least in part on the at least one parameter, to determine the information associated with the at least one MAC; determining at least one authentication code based at least in part on the information associated with the at least one MAC; and comparing the at least one authentication code with the at least one MAC to determine the authenticity status of the at least one control communication.

Aspect 42: A method of wireless communication performed by a transmitter network node, comprising: generating at least one control communication comprising a first part and a second part, wherein a common security key corresponds to the first part and a private security key corresponds to the second part; and transmitting the at least one control communication to a receiver user equipment (UE).

Aspect 43: The method of Aspect 42, wherein the first part includes a set of encoded common information and the second part includes a set of encoded private information.

Aspect 44: The method of Aspect 43, wherein the at least one control communication comprises: a first sidelink control information (SCI) communication comprising the set of encoded common information; and a second SCI communication comprising the set of encoded private information.

Aspect 45: The method of any of Aspects 42-44, wherein the common security key comprises a pre-configured security key.

Aspect 46: The method of any of Aspects 42-45, further comprising transmitting a configuration that indicates the common security key.

Aspect 47: The method of Aspect 46, wherein the transmitter network node comprises at least one of a base station or a roadside unit.

Aspect 48: The method of any of Aspects 42-47, wherein the transmitter network node comprises a transmitter UE, and wherein the receiver UE is an intended recipient of the at least one control communication, the at least one control communication comprising at least one sidelink communication.

Aspect 49: The method of Aspect 48, wherein the receiver UE comprises at least one of an intended unicast recipient of the at least one sidelink communication or an intended groupcast recipient of the at least one sidelink communication, wherein the private security key is based at least in part on the receiver UE comprising the at least one of the intended unicast recipient of the at least one sidelink communication or the intended groupcast recipient of the at least one sidelink communication.

Aspect 50: The method of either of Aspects 48 or 49, wherein the receiver UE is located within a specified distance of the transmitter network node, and wherein the private security key is based at least in part on the receiver UE being located within the specified distance of the transmitter network node.

Aspect 51: The method of any of Aspects 48-50, wherein the private security key is based at least in part on a configured higher layer key.

Aspect 52: The method of Aspect 51, wherein the configured higher layer key comprises at least one of: a radio resource control (RRC) integrity protection key, an RRC signal ciphering key, or a Next Generation Radio Access Network (NG-RAN) cryptographic key.

Aspect 53: The method of Aspect 52, wherein the private security key is based at least in part on a key derivation function, wherein the key derivation function is a function of the NG-RAN cryptographic key, a current slot number, and a set of signaling parameters.

Aspect 54: The method of Aspect 53, wherein the private security key corresponds to a first slot and an additional private security key corresponds to a second slot.

Aspect 55: The method of any of Aspects 48-54, wherein the private security key is based at least in part on one or more physical channel characteristics associated with the at least one sidelink communication.

Aspect 56: The method of any of Aspects 48-55, wherein the at least one sidelink communication is a unicast communication, and wherein the private security key is based at least in part on a channel reciprocity between the transmitter UE and the receiver UE.

Aspect 57: The method of any of Aspects 48-56, wherein the private security key is based at least in part on a configured higher layer key and one or more physical channel characteristics associated with the at least one sidelink communication.

Aspect 58: The method of any of Aspects 42-57, further comprising transmitting, to the receiver UE, at least one message authentication code (MAC).

Aspect 59: The method of Aspect 58, wherein the at least one control communication comprises a first sidelink control information (SCI) communication and a second SCI communication, and wherein the at least one MAC comprises a first MAC corresponding to the first SCI communication and a second MAC corresponding to the second SCI communication.

Aspect 60: The method of Aspect 59, wherein the first MAC is based at least in part on the common security key and one or more information bits associated with the first SCI communication, and wherein the second MAC is based at least in part on the private security key and one or more information bits associated with the second SCI communication.

Aspect 61: The method of Aspect 60, wherein the first SCI communication corresponds to a first SCI message comprising a first set of specified data fields that include the one or more information bits associated with the first SCI communication, and wherein the second SCI communication corresponds to a second SCI message comprising a second set of specified data fields that include the one or more information bits associated with the second SCI communication.

Aspect 62: The method of Aspect 61, wherein the first SCI message comprises a first dedicated data field that includes the first MAC, and wherein the second SCI message comprises a second dedicated data field that includes the second MAC.

Aspect 63: The method of Aspect 61, wherein the at least one MAC comprises a third MAC based at least in part on the private security key and the one or more information bits associated with the first SCI communication.

Aspect 64: The method of Aspect 63, wherein the third MAC is carried in a dedicated data field in the first SCI communication or the second SCI communication.

Aspect 65: The method of any of Aspects 59-64, wherein the first MAC is based at least in part on the common security key and a first set of encoded bits associated with the first SCI communication, and wherein the second MAC is based at least in part on the private security key and a second set of encoded bits associated with the second SCI communication.

Aspect 66: The method of Aspect 65, wherein the first MAC is appended to the first set of encoded bits, and wherein the second MAC is appended to the second set of encoded bits.

Aspect 67: The method of any of Aspects 59-66, wherein the first MAC is based at least in part on a first set of encoded bits associated with the first SCI communication, and wherein the second MAC is based at least in part on the first set of encoded bits.

Aspect 68: The method of Aspect 67, wherein the first MAC is appended to a second set of encoded bits associated with the second SCI communication, and wherein the second MAC is appended to the second set of encoded bits.

Aspect 69: The method of any of Aspects 58-68, wherein the at least one control communication comprises a set of encoded common information corresponding to a set of common information associated with the first part and a set of encoded private information corresponding to a set of private information associated with the second part, and wherein the at least one MAC comprises a first MAC corresponding to the set of common information and a second MAC corresponding to the set of private information.

Aspect 70: The method of Aspect 69, wherein the first MAC is based at least in part on the set of common information and the common security key, and wherein the second MAC is based at least in part on the set of private information and the private security key.

Aspect 71: The method of Aspect 70, further comprising transmitting at least one physical sidelink shared channel communication that includes the first MAC and the second MAC.

Aspect 72: The method of either of Aspects 70 or 71, wherein the at least one MAC further comprises a third MAC based at least in part on the set of common information and the private security key.

Aspect 73: The method of any of Aspects 58-72, wherein the at least one control communication comprises a first sidelink control information (SCI) communication, a second SCI communication, and a third SCI communication, and wherein the third SCI communication comprises information associated with the at least one MAC.

Aspect 74: The method of Aspect 73, wherein the second SCI communication indicates at least one parameter for decoding the third SCI communication.

Aspect 75: An apparatus for wireless communication at a device, comprising a processor; memory coupled with the processor; and instructions stored in the memory and executable by the processor to cause the apparatus to perform the method of one or more of Aspects 1-41.

Aspect 76: A device for wireless communication, comprising a memory and one or more processors coupled to the memory, the one or more processors configured to perform the method of one or more of Aspects 1-41.

Aspect 77: An apparatus for wireless communication, comprising at least one means for performing the method of one or more of Aspects 1-41.

Aspect 78: A non-transitory computer-readable medium storing code for wireless communication, the code comprising instructions executable by a processor to perform the method of one or more of Aspects 1-41.

Aspect 79: A non-transitory computer-readable medium storing a set of instructions for wireless communication, the set of instructions comprising one or more instructions that, when executed by one or more processors of a device, cause the device to perform the method of one or more of Aspects 1-41.

Aspect 80: An apparatus for wireless communication at a device, comprising a processor; memory coupled with the processor; and instructions stored in the memory and executable by the processor to cause the apparatus to perform the method of one or more of Aspects 42-74.

Aspect 81: A device for wireless communication, comprising a memory and one or more processors coupled to the memory, the one or more processors configured to perform the method of one or more of Aspects 42-74.

Aspect 82: An apparatus for wireless communication, comprising at least one means for performing the method of one or more of Aspects 42-74.

Aspect 83: A non-transitory computer-readable medium storing code for wireless communication, the code comprising instructions executable by a processor to perform the method of one or more of Aspects 42-74.

Aspect 84: A non-transitory computer-readable medium storing a set of instructions for wireless communication, the set of instructions comprising one or more instructions that, when executed by one or more processors of a device, cause the device to perform the method of one or more of Aspects 42-74.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a receiver user equipment (UE), comprising:
   receiving at least one control communication that includes a first part and a second part;
   determining an authenticity status of the at least one control communication based at least in part on at least one message authentication code (MAC), the MAC is based at least in part on a common security key corresponding to the first part or a private security key corresponding to the second part, the at least one control communication includes a first sidelink control information (SCI) communication and a second SCI communication, and the at least one MAC includes a first MAC corresponding to the first SCI communication and a second MAC corresponding to the second SCI communication; and
   performing a wireless communication task based at least in part on the authenticity status of the at least one control communication.

2. The method of claim 1, wherein the first part comprises a first sidelink control information (SCI) communication comprising a set of encoded common information; and wherein the second part comprises a second SCI communication comprising a set of encoded private information.

3. The method of claim 1, wherein the common security key comprises a pre-configured security key.

4. The method of claim 1, further comprising receiving a configuration that indicates the common security key.

5. The method of claim 4, wherein the reception of the configuration comprises receiving the configuration from at least one of a network entity or a roadside unit.

6. The method of claim 1, wherein the reception of the at least one control communication comprises receiving at least one sidelink communication from a transmitter UE, wherein the receiver UE is an intended recipient of the at least one sidelink communication, the method further comprising deriving the private security key.

7. The method of claim 6, wherein the receiver UE comprises at least one of an intended unicast recipient of the at least one sidelink communication or an intended groupcast recipient of the at least one sidelink communication, wherein the private security key is based at least in part on the UE comprising the at least one of the intended unicast recipient of the at least one sidelink communication or the intended groupcast recipient of the at least one sidelink communication.

8. The method of claim 6, wherein the receiver UE is located within a specified distance of the transmitter UE, and wherein the private security key is based at least in part on the receiver UE being located within the specified distance of the transmitter UE.

9. The method of claim 6, wherein the private security key is based at least in part on a configured higher layer key.

10. The method of claim 1, wherein the first MAC is based at least in part on the common security key and one or more information bits associated with the first SCI communication, and wherein the second MAC is based at least in part on the private security key and one or more information bits associated with the second SCI communication.

11. The method of claim 10, wherein the first SCI communication corresponds to a first SCI message comprising a first set of specified data fields that include the one or more information bits associated with the first SCI communication, and wherein the second SCI communication corresponds to a second SCI message comprising a second set of specified data fields that include the one or more information bits associated with the second SCI communication.

12. The method of claim 11, wherein the first SCI message comprises a first dedicated data field that includes the first MAC, and wherein the second SCI message comprises a second dedicated data field that includes the second MAC.

13. The method of claim 12, wherein the determination of the authenticity status of the at least one control communication comprises:
    decoding the first SCI communication to determine a first set of decoded data fields corresponding to the first set of specified data fields, wherein the first set of decoded data fields excludes the first dedicated data field;
    determining a first authentication code based at least in part on the first set of decoded data fields and the common security key;
    comparing the first authentication code with the first MAC to determine an authenticity status of the first SCI communication;
    decoding the second SCI communication to determine a second set of decoded data fields corresponding to the second set of specified data fields, wherein the second set of decoded data fields excludes the second dedicated data field;
    determining a second authentication code based at least in part on the second set of decoded data fields and the private security key; and
    comparing the second authentication code with the second MAC to determine an authenticity status of the second SCI communication.

14. The method of claim 11, wherein the second SCI communication comprises a first dedicated data field that includes the first MAC, and wherein the second SCI communication comprises a second dedicated data field that includes the second MAC.

15. The method of claim 14, wherein the determination of the authenticity status of the at least one control communication comprises:
    decoding the first SCI communication to determine a first set of decoded data fields corresponding to the first set of specified data fields;
    determining a first authentication code based at least in part on the first set of decoded data fields and the common security key;
    comparing the first authentication code with the first MAC to determine an authenticity status of the first SCI communication;
    decoding the second SCI communication to determine a second set of decoded data fields corresponding to the second set of specified data fields, wherein the second set of decoded data fields excludes the first dedicated data field and the second dedicated data field;
    determining a second authentication code based at least in part on the second set of decoded data fields and the private security key; and
    comparing the second authentication code with the second MAC to determine an authenticity status of the second SCI communication.

16. The method of claim 14, wherein the at least one MAC comprises a third MAC based at least in part on the private security key and the one or more information bits associated with the first SCI communication.

17. The method of claim 16, wherein the third MAC is carried in a dedicated data field in the first SCI communication or the second SCI communication, and wherein the determination of the authenticity status of the at least one control communication comprises:
    decoding the first SCI communication to determine a first set of decoded data fields corresponding to the first set of specified data fields, wherein the first set of decoded data fields excludes the first dedicated data field;
    determining a first authentication code based at least in part on the first set of decoded data fields and the common security key;
    comparing the first authentication code with the first MAC to determine an authenticity status of the first SCI communication;
    decoding the second SCI communication to determine a second set of decoded data fields corresponding to the second set of specified data fields, wherein the second set of decoded data fields excludes the second dedicated data field;
    determining a second authentication code based at least in part on the second set of decoded data fields and the private security key;
    comparing the second authentication code with the second MAC to determine an authenticity status of the second SCI communication;
    determining a third authentication code based at least in part on the first set of decoded data fields and the private security key; and
    comparing the third authentication code with the third MAC to determine an authenticity status of the second SCI communication.

18. The method of claim 1, wherein the first MAC is based at least in part on the common security key and a first set of encoded bits associated with the first SCI communication, and wherein the second MAC is based at least in part on the private security key and a second set of encoded bits associated with the second SCI communication.

19. The method of claim 1, wherein the first MAC is based at least in part on a first set of encoded bits associated with the first SCI communication, and wherein the second MAC is based at least in part on the first set of encoded bits.

20. The method of claim 1, wherein the at least one control communication comprises a set of encoded common information corresponding to a set of common information associated with the first part and a set of encoded private information corresponding to a set of private information associated with the second part, and wherein the at least one MAC comprises a first MAC corresponding to the set of common information and a second MAC corresponding to the set of private information.

21. The method of claim 20, further comprising receiving at least one physical sidelink shared channel communication that includes the first MAC and the second MAC.

22. The method of claim 1, wherein the at least one control communication comprises a first sidelink control information (SCI) communication, a second SCI communication, and a third SCI communication, wherein the third SCI communication comprises information associated with the at least one MAC, wherein the second SCI communication indicates at least one parameter for decoding the third SCI communication, and wherein the determination of the authenticity status of the at least one control communication comprises:
  decoding the first SCI communication to determine a format of the second SCI communication;
  decoding the second SCI communication, based at least in part on the format of the second SCI communication, to determine the at least one parameter for decoding the third SCI communication;
  decoding the third SCI communication, based at least in part on the at least one parameter, to determine the information associated with the at least one MAC;
  determining at least one authentication code based at least in part on the information associated with the at least one MAC; and
  comparing the at least one authentication code with the at least one MAC to determine the authenticity status of the at least one control communication.

23. A receiver user equipment (UE) for wireless communication, comprising:
  a memory; and
  one or more processors, coupled to the memory, configured to:
    receive at least one control communication that includes a first part and a second part;
    determine an authenticity status of the at least one control communication based at least in part on at least one message authentication code (MAC), the MAC is based at least in part on a common security key corresponding to the first part or a private security key corresponding to the second part, the at least one control communication includes a first sidelink control information (SCI) communication and a second SCI communication, and the at least one MAC includes a first MAC corresponding to the first SCI communication and a second MAC corresponding to the second SCI communication; and
    perform a wireless communication task based at least in part on the authenticity status of the at least one control communication.

24. The UE of claim 23, wherein the first part comprises a first sidelink control information (SCI) communication comprising a set of encoded common information; and wherein the second part comprises a second SCI communication comprising a set of encoded private information.

* * * * *